(12) United States Patent
Clark et al.

(10) Patent No.: US 9,482,380 B2
(45) Date of Patent: *Nov. 1, 2016

(54) ARTICULATING DRILL METHOD AND APPARATUS FOR CUTTING OPENINGS IN NESTED STRINGS OF UNDERWATER PIPING AND OR TUBING FOR OVERTURNED WELLS OR PLATFORMS

(71) Applicant: Tetra Technologies, Inc., The Woodlands, TX (US)

(72) Inventors: Galen R. Clark, Lafayette, LA (US); Ames Lafferty, Carencro, LA (US); Clint Musemeche, Youngsville, LA (US); Clayton Claxton, Lafayette, LA (US)

(73) Assignee: TETRA Technologies, Inc., The Woodlands, TX (US)

( * ) Notice: Subject to any disclaimer, the term of this patent is extended or adjusted under 35 U.S.C. 154(b) by 190 days.

This patent is subject to a terminal disclaimer.

(21) Appl. No.: 14/144,942

(22) Filed: Dec. 31, 2013

(65) Prior Publication Data

US 2014/0241822 A1   Aug. 28, 2014

Related U.S. Application Data

(63) Continuation of application No. 12/751,418, filed on Mar. 31, 2010, now Pat. No. 8,616,811.

(60) Provisional application No. 61/165,475, filed on Mar. 31, 2009.

(51) Int. Cl.
*B23B 41/08* (2006.01)
*F16L 41/06* (2006.01)

(Continued)

(52) U.S. Cl.
CPC .............. *F16L 41/06* (2013.01); *B23B 41/003* (2013.01); *B23B 47/281* (2013.01); *E21B 17/01* (2013.01); *E21B 29/10* (2013.01); *E21B 29/12* (2013.01); *B23B 2215/72* (2013.01); *E02B 2017/0052* (2013.01); *Y10T 137/0458* (2015.04); *Y10T 137/0463* (2015.04); *Y10T 137/0469* (2015.04); *Y10T 137/612* (2015.04);

(Continued)

(58) Field of Classification Search
CPC .................. Y10T 408/5619; Y10T 137/6123; Y10T 408/567; Y10T 408/563; Y10T 408/5612; F16L 41/06; F16L 41/04; B23B 47/281; B23B 2215/72
USPC ...... 408/129, 115 R, 101, 99, 103, 100, 102, 408/107, 110, 111; 137/317, 318, 15.12, 137/15.13, 15.14, 15.11; 173/31, 32, 28, 173/42, 38
See application file for complete search history.

(56) References Cited

U.S. PATENT DOCUMENTS

| | | | |
|---|---|---|---|
| 1,279,153 A * | 9/1918 | Peterson | B23B 35/005 408/95 |
| 3,806,691 A * | 4/1974 | Roach | B23H 7/26 219/69.11 |

(Continued)

*Primary Examiner* — Eric A Gates
*Assistant Examiner* — Paul M Janeski
(74) *Attorney, Agent, or Firm* — Garvey, Smith, Nehrbass & North LLC; Brett A. North

(57) ABSTRACT

A method and apparatus for angularly drilling during a tapping procedure into a pressurized multiple strings of coaxially situated tubulars for wells and/or platforms which have overturned wherein the tapping occurs underwater via a diver or remotely operated vehicle.

21 Claims, 41 Drawing Sheets

(51) Int. Cl.
*E21B 29/10* (2006.01)
*E21B 29/12* (2006.01)
*B23B 41/00* (2006.01)
*B23B 47/28* (2006.01)
*E21B 17/01* (2006.01)
*E02B 17/00* (2006.01)

(52) U.S. Cl.
CPC .... *Y10T 137/6123* (2015.04); *Y10T 137/8359* (2015.04); *Y10T 408/563* (2015.01); *Y10T 408/567* (2015.01); *Y10T 408/5612* (2015.01); *Y10T 408/56275* (2015.01)

(56) References Cited

U.S. PATENT DOCUMENTS

| | | | | |
|---|---|---|---|---|
| 3,922,107 A * | 11/1975 | Fowler | B23B 51/044 | 408/204 |
| 4,094,612 A * | 6/1978 | Krieg | B25H 1/0064 | 248/230.9 |
| 4,152,090 A * | 5/1979 | Harris | B23B 47/281 | 408/104 |
| 4,369,845 A * | 1/1983 | Henson | C09K 8/42 | 137/318 |
| 4,936,720 A * | 6/1990 | Dolatowski | B25H 1/0064 | 408/100 |
| 5,118,228 A * | 6/1992 | Story | B23B 41/00 | 408/107 |
| 5,217,073 A * | 6/1993 | Bruns | F16L 55/105 | 166/298 |
| 5,713,702 A * | 2/1998 | Turner | B23B 41/006 | 408/100 |
| 5,863,160 A * | 1/1999 | Havener | B25H 1/005 | 408/103 |
| 5,902,077 A * | 5/1999 | Halder | B23B 39/14 | 408/100 |
| 6,050,753 A * | 4/2000 | Turner | B25H 1/0064 | 408/712 |
| 6,200,068 B1 * | 3/2001 | Bath | F16L 1/26 | 134/167 C |
| 6,761,511 B2 * | 7/2004 | Turner | B23B 47/281 | 137/318 |
| 7,070,366 B2 * | 7/2006 | Reichenberger | B25H 1/0064 | 408/111 |
| 7,125,206 B2 * | 10/2006 | Turner | B25H 1/0064 | 408/103 |
| 7,435,041 B1 * | 10/2008 | McGill | B25H 1/0064 | 408/110 |
| 7,607,870 B2 * | 10/2009 | Hughes, Jr. | B23B 41/003 | 408/103 |
| 8,333,211 B2 * | 12/2012 | McGraw | E21B 29/12 | 137/15.12 |
| 2004/0118577 A1 * | 6/2004 | Morissette | B25D 17/28 | 173/38 |

\* cited by examiner

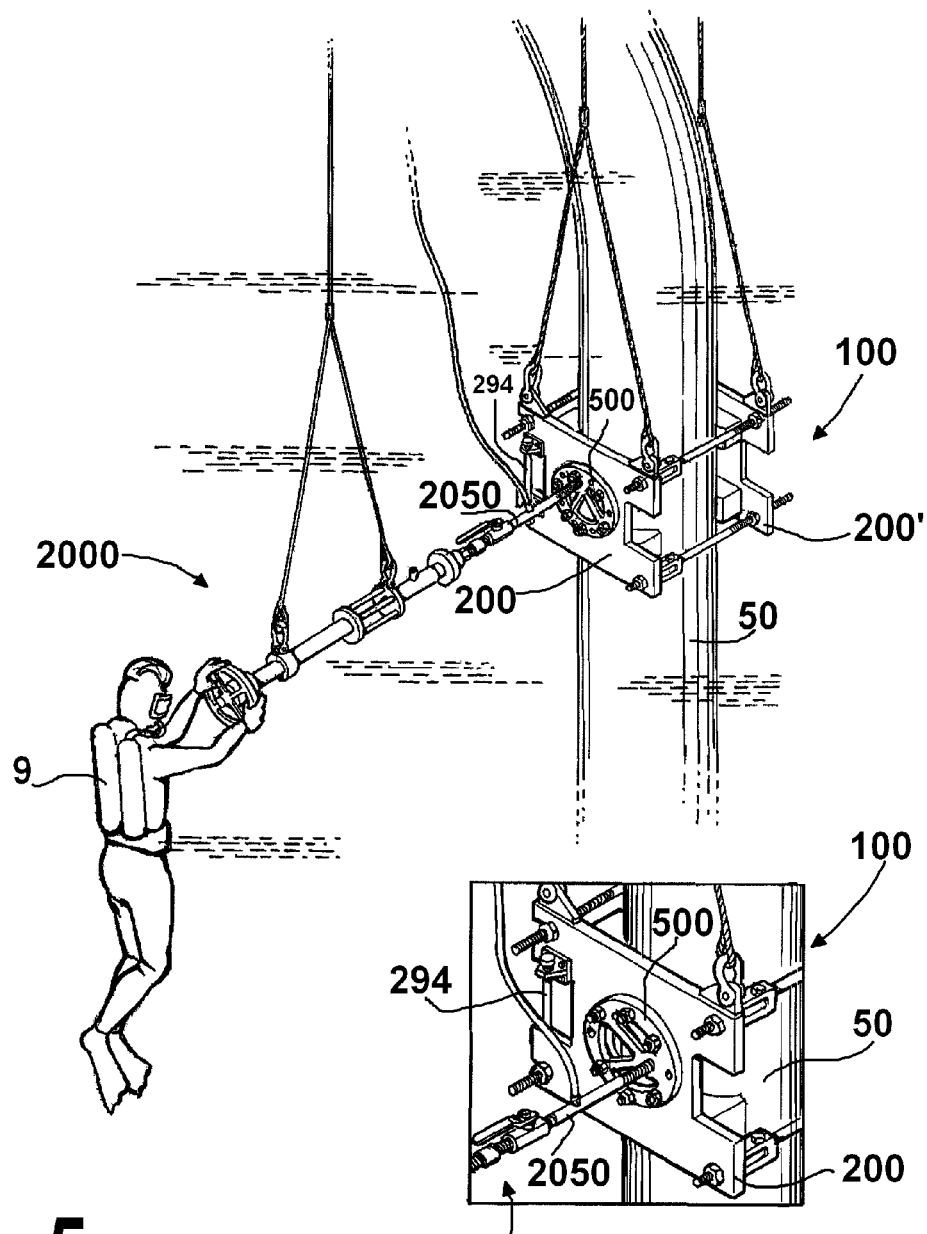

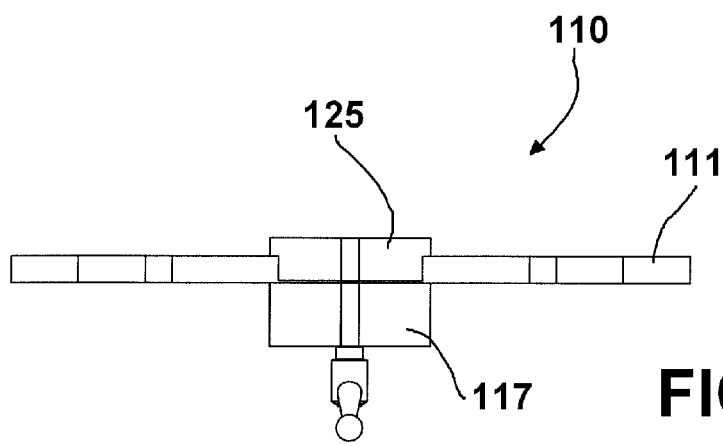
FIG. 50
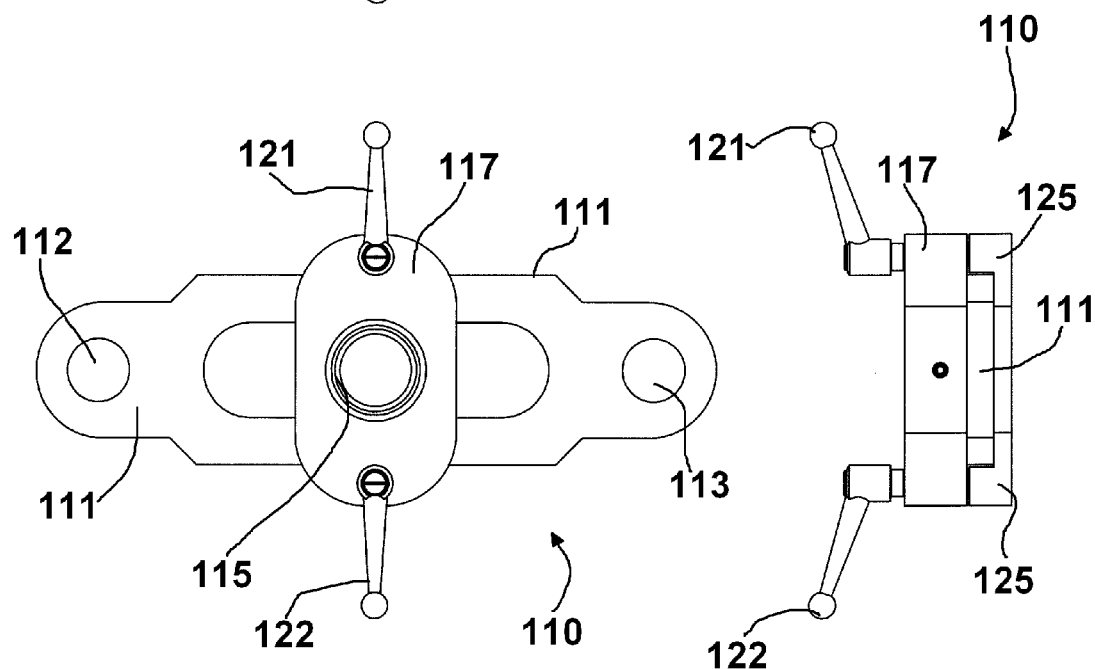
FIG. 48
FIG. 49

ARTICULATING DRILL METHOD AND APPARATUS FOR CUTTING OPENINGS IN NESTED STRINGS OF UNDERWATER PIPING AND OR TUBING FOR OVERTURNED WELLS OR PLATFORMS

CROSS-REFERENCE TO RELATED APPLICATIONS

This is a continuation of U.S. patent application Ser. No. 12/751,418, filed Mar. 31, 2010 (issuing as U.S. Pat. No. 8,616,811 on Dec. 31, 2013), which application both claims the benefit of and is a non-provisional of U.S. Provisional patent application Ser. No. 61/165,475, filed Mar. 31, 2009. Each of these applications are incorporated herein by reference and priority to each is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

Abandonment Procedure for Wells on a Platform That Has Fallen over. There are basically two ways to restore control of the wells on a platform that has fallen over. Abandon the wells completely in the order they are accessed, or remove the bent or broken portion of the well and install a subsea wellhead. However, when removing the bent or broken part of the pipe such piping may still be under pressure such pressure dealt with before removal. Otherwise, a blow out could occur.

The present invention relates to the cutting of multiple nested (e.g., coaxial) strings of underwater piping and/or tubing for overturned wells and/or platforms using a specially configured articulating drill apparatus and method.

Under pressure drilling or hot tapping is the process of drilling into a pressured pipe or vessel using special equipment and procedures to ensure that the pressure and fluids are safely contained when access is made. The most common example of a hot tap is into a pressured pipeline.

SUMMARY

In one embodiment is provided an articulating saw for use in a hot tapping method and apparatus which can hot tap one or more multiple coaxial strings of underwater piping and/or tubing for overturned wells and/or platforms.

In one embodiment is provided a clamping system which has angular adjustment of tapping tool both up and down and side to side, in a spherical manner.

In one embodiment is provided an articulating drill system which can be pivotally mounted on the clamp for hot tapping tool. In one embodiment drill system can be lowered with clamp while pivotally mounted on clamp. In one embodiment drill system is attached to clamp while underwater.

In one embodiment an articulating saw can have articulating adjustments of at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 50, 55, 60, 65, 70, 75, 80, 85, and 90 degree increments. In one embodiment the rotational adjustability is between about any two of the above specified angular increments.

The present invention provides an articulating drill system for cutting one or more tubular members. The apparatus includes a drill base and an articulating boom attached at one end portion to the base. The boom includes a first arm, a second arm, and pivotal connections joining the first and second arms. The plate supports a plate having a plate opening, wherein the plate is attached to the second arm and the base is attached to the first arm. A drill motor has a motor, a cutting tip, and a cutting axis. The drill motor is supported upon the base. A clamping mechanism enables the plate to be attached to a tubular that is to be cut, the clamping mechanism generally aligning the plate opening with the tubular. The clamping mechanism and plate support the articulating boom, drill and drill base. The articulating boom enables selective placement of the drill cutting tip relative to the plate opening, including angulation of the cutting axis relative to the plate opening.

In one embodiment, the articulating drill system provides an adjustment mechanism interfacing the drill motor and the base, the adjustment mechanism enabling selective movement of the drill motor toward or away from the articulating boom.

In one embodiment, the drill motor is movable upon the base along a longitudinal axis.

In one embodiment, the drill motor is movable upon the base along a transverse axis.

In one embodiment, the drill motor is movable upon the base along intersecting longitudinal and transverse axes.

In one embodiment, the base includes a base plate and a motor mount and wherein the drill motor is attached to the motor mount and wherein said adjustment mechanism is in between the motor mount and the base plate.

In one embodiment, the motor that is attached to the motor mount.

In one embodiment, the cutting tip is a generally cylindrically shaped cutting member.

In one embodiment, the plate is pivotally attached to the first arm.

In one embodiment, the plate is pivotally attached to the first arm with a pivot pin, the plate and first arm being adjustably connected at the pivot pin, enabling the elevation of the plate to be changed relative to the first arm.

In one embodiment, the drill base includes a first lower base plate and a second higher base plate, the first base plate and second base plate being movable, one relative to the other.

In one embodiment, the lower base plate has rails and the upper base plate travels upon the rails.

In one embodiment, the drill base includes a motor mount that travels upon the upper base plate.

In one embodiment, the upper base plate slides upon the lower base plate along a first axis.

In one embodiment, the drill base includes a motor mount, and the motor mount slides upon the upper base plate along a second axis that forms an angle with the first axis.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 5 is a perspective view illustrating the step of hot tapping one or more of the nested tubulars.

FIG. 6 is a closeup perspective view of a hot tap tool attached to a housing.

FIGS. 48, 49, and 50 are front, side and top views of the stabilizer system of FIG. 46.

DETAILED DESCRIPTION

Figure 1:
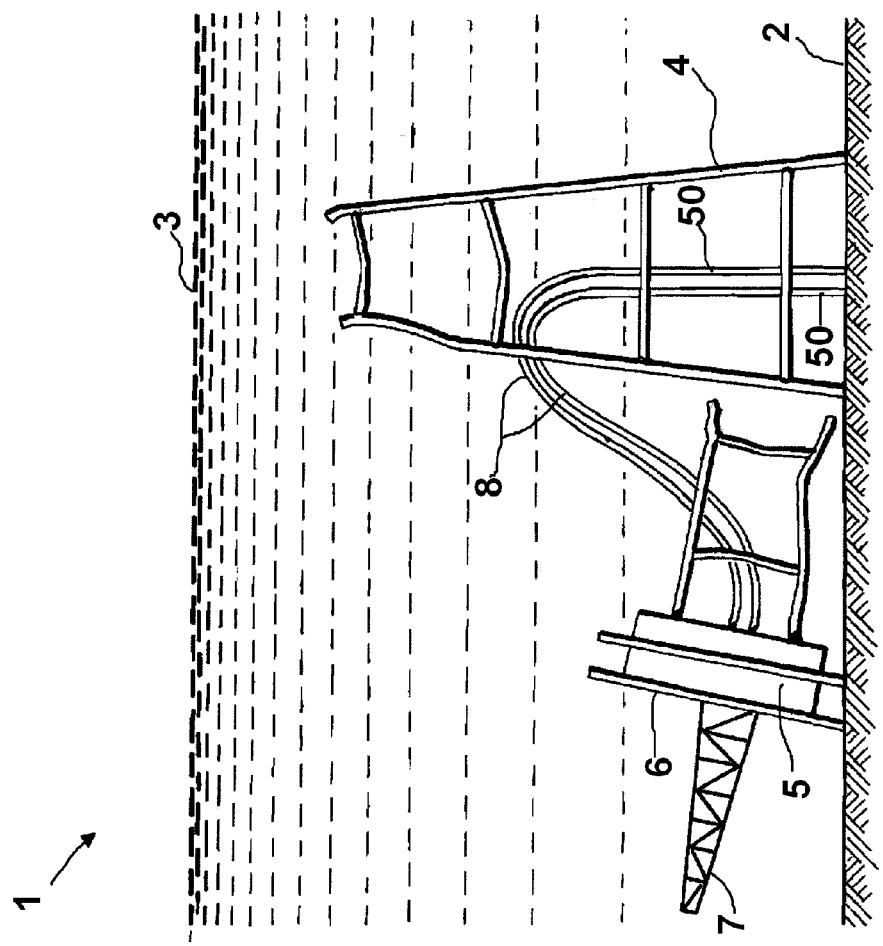
FIG. 1 is an overall perspective view of a platform which has fallen over and needs to be plugged and abandoned (with two riser piping systems although up to 24 or more riser piping systems can be seen).

FIG. 1 shows a damaged marine platform 1. The platform 1 can be any offshore or marine platform such as a drilling platform, production platform or the like. Such a platform is normally supported by an underwater jacket 4 that is anchored to seabed 2. When a fierce storm such as a hurricane strikes, the upper 5 can be separated from jacket 4 by wind and wave action at water surface area 3. Upper 5 can be any known above water upper such as drilling (e.g., derrick 7) or production structures having one or more decks 6. When a hurricane separates upper 5 from jacket 4, tubulars 50 can remain under pressure though bent at bends 8 as shown. Often, multiple nested tubulars are present.

One embodiment includes an articulating drill system 1100 which can be used in the process of hot tapping a string of a plurality of pipes or tubing system. The plurality of pipes can include first pipe 50, second pipe 60, third pipe 70, and fourth pipe or tubing 80. Between first and second pipes is annular space 62. Between second and third pipes is annular space 72. Between third and fourth pipes is annular space 82 (see FIGS. 9 and 10).

In one embodiment articulating drill system can be used with a hot tap system 10, which can include adjustable clamp 100 (see FIGS. 2-24). In one embodiment hot tap system 10 can include a plate 200 and one or more chains 150. In one embodiment adjustable clamp 100 can include first and second plates 200, 200' and are threadably connected to each other and can be frictionally connected to a pipe.

Figure 2:
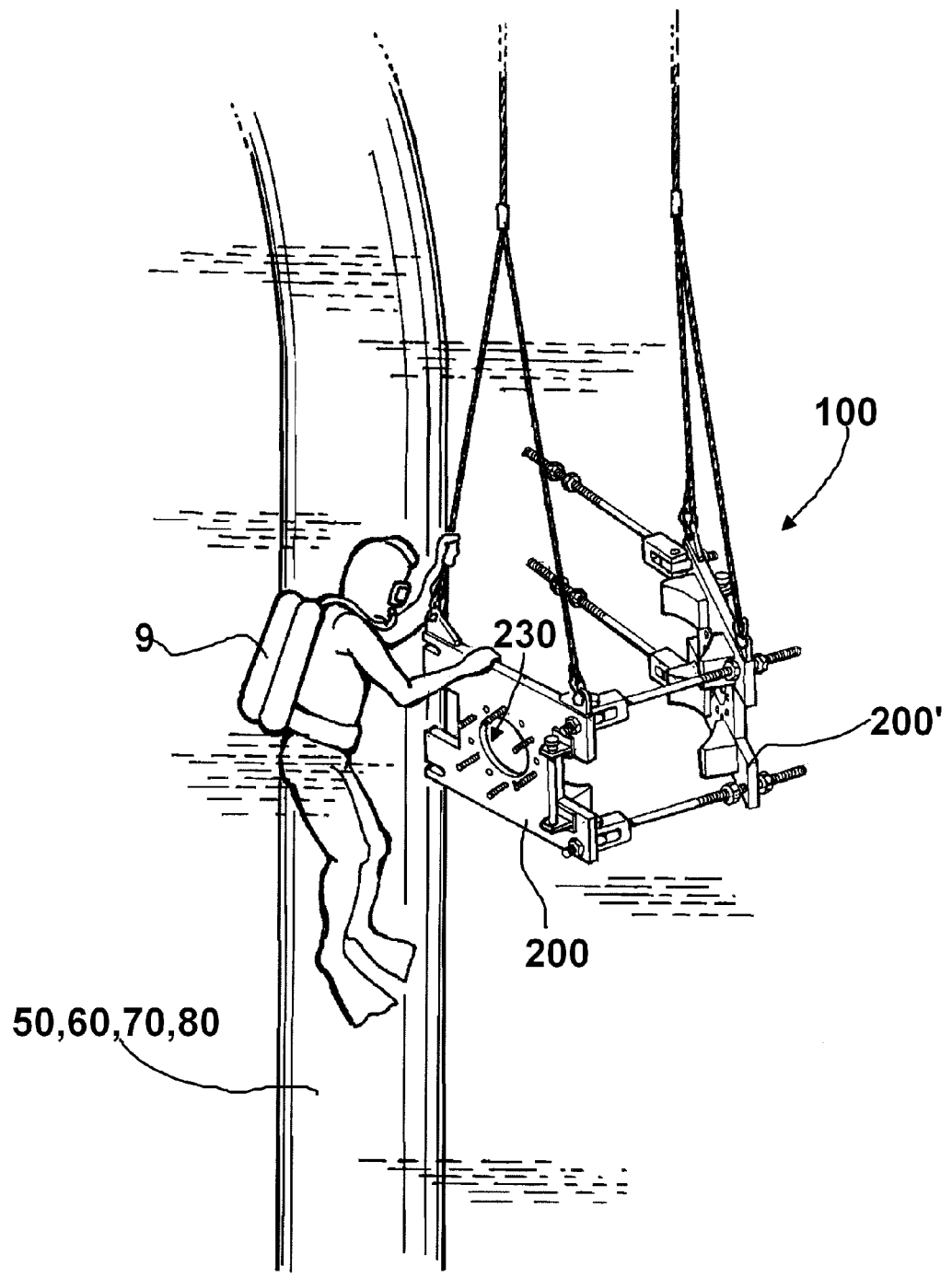
FIG. 2 is a perspective view illustrating the step of lowering one embodiment of a hot tap housing and attaching the housing to one of the riser piping systems (below the bend in the riser). The articulating drill method and apparatus can be used with multiple types of hot tap housings and is not limited to the particular hot tap housing shown (and can be used with systems beyond hot tap systems).
Figure 3:
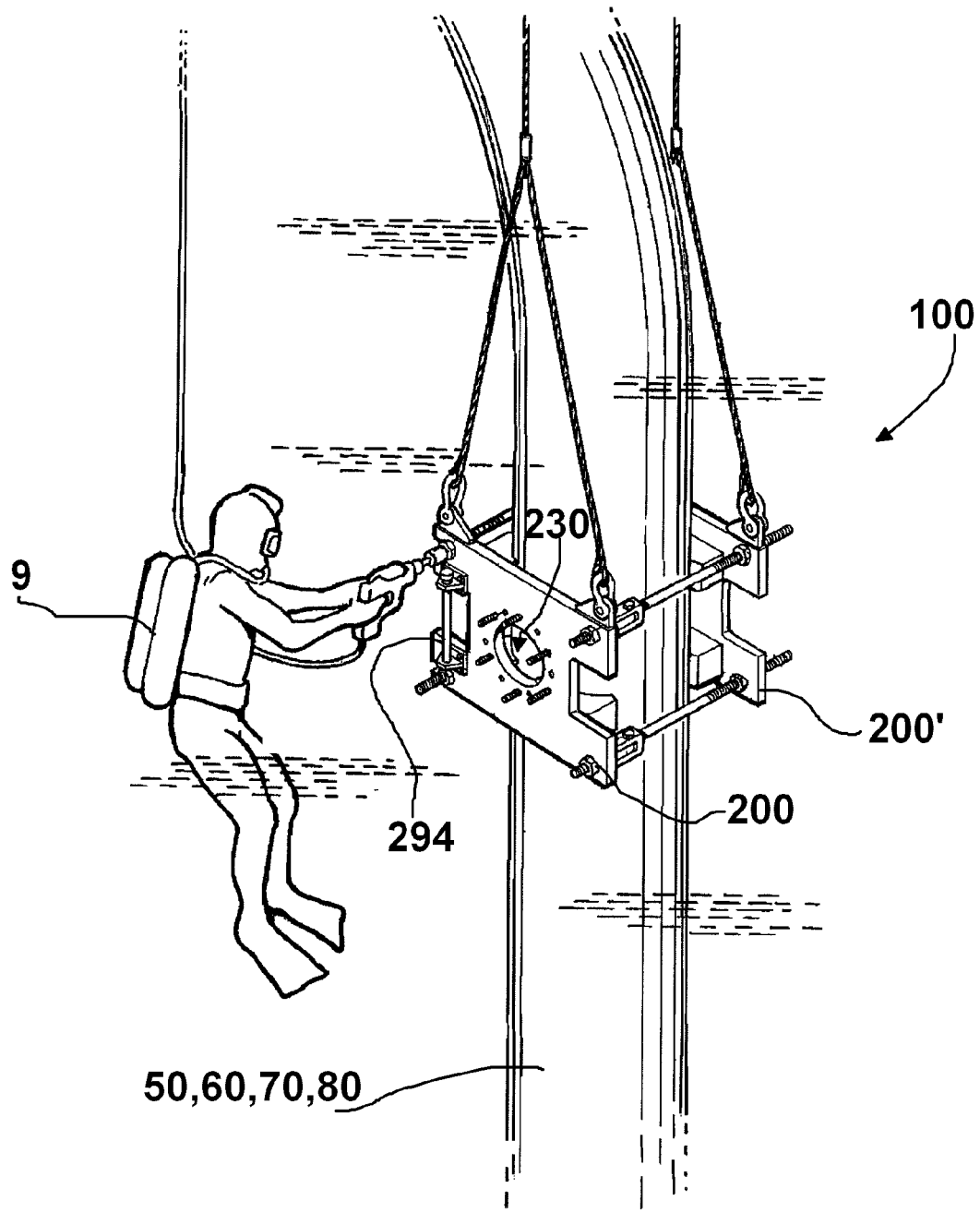
FIG. 3 is a perspective view illustrating the step of tightening the hot tap housing below the bend in the riser.
Figure 4:
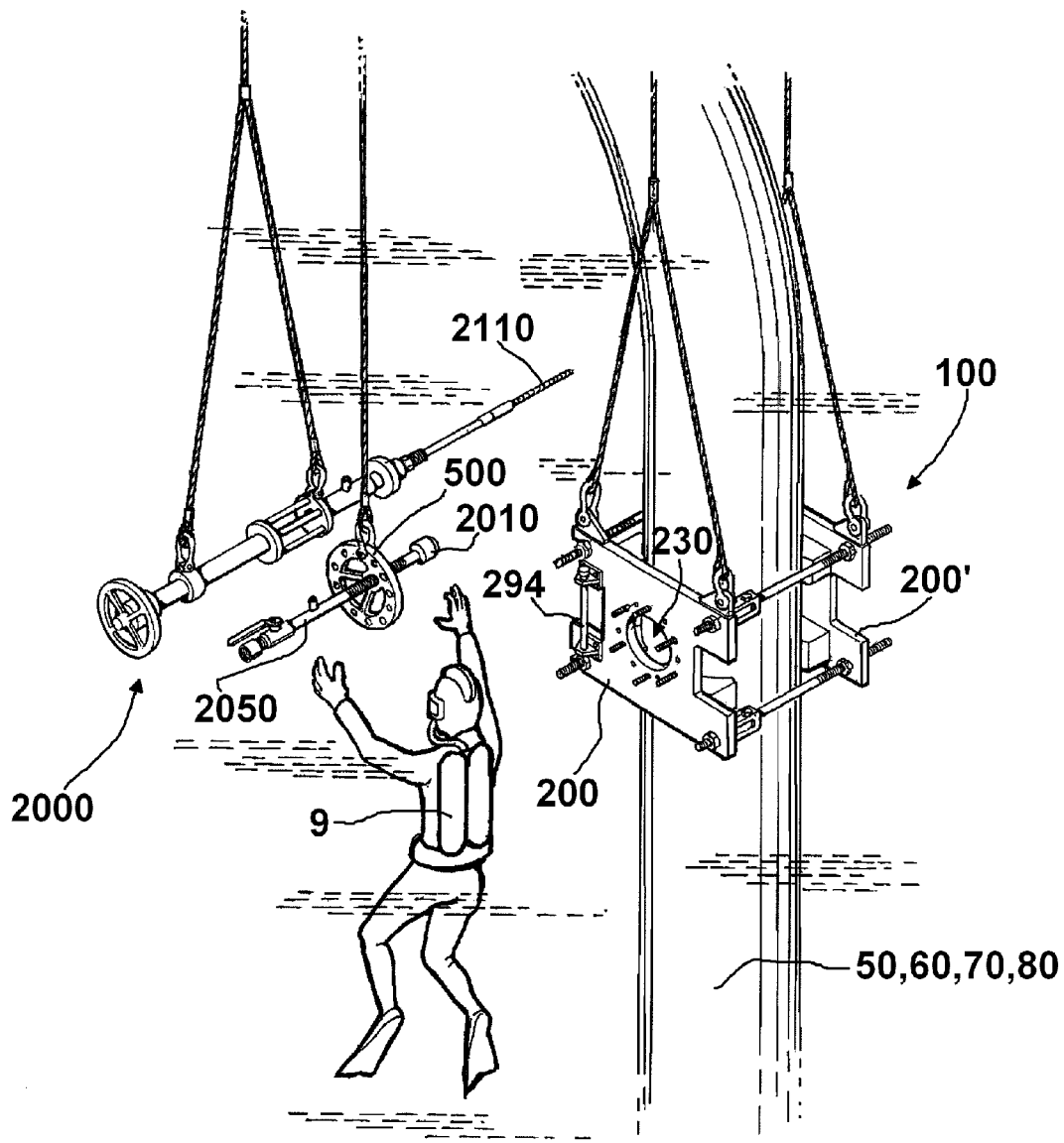
FIG. 4 is a perspective view illustrating the step of lowering a hot tap tool which will be attached to the hot tap housing for hot tapping one or more of the nested tubulars.

FIG. 2 is a perspective view illustrating the step of lowering a hot tap housing 100 (two plate embodiment) and a diver 9 attaching the housing to one of the riser piping systems (e.g. nested tubulars 50, 60, 70, 80) below the bend 8 in the riser 50, 60, 70, 80. FIG. 3 is a perspective view illustrating the step of the diver 9 tightening the hot tap housing 100 (two plate embodiment) below the bend in the riser. FIG. 4 is a perspective view illustrating the step of lowering to a diver 9 (from a surface vessel, not shown) the hot tap tool 2000 along with a hot tap tip and housing which will be attached to the hot tap housing 100 for hot tapping one or more of the nested tubulars 50, 60, 70, 80.

FIG. 5 is a perspective view illustrating the step of a diver 9 hot tapping one or more of the nested tubulars 50, 60, 70, 80 where the hot tap tool is rotatively connected to the circular thrust/articulating plate at a selected rotational position. The one or more windows in the thrust plate allow the user (e.g. diver 9) to see the tip of the hot tap tool 2000 to obtain a good position between the hot tap tip and the nested tubular 50 or 60 or 70 or 80 being hot tapped.

FIG. 6 is a closeup perspective view of hot tap tool 2000 after being connected to the hot tap housing 100.

Figure 7:
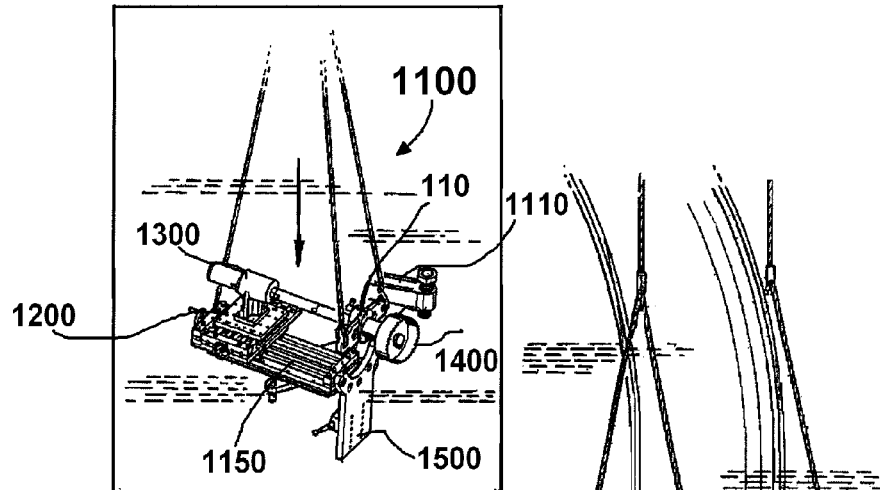
FIG. 7 is a perspective view illustrating the step of lowering one embodiment of an articulating saw and attaching the articulating saw to the hot tap housing (shown in FIG. 5). The saw can be pivotally attached to the hot tap housing via a pin on one side and a support plate on another side. The saw also has an articulating and sliding support join for the rotating saw shaft
Figure 8:
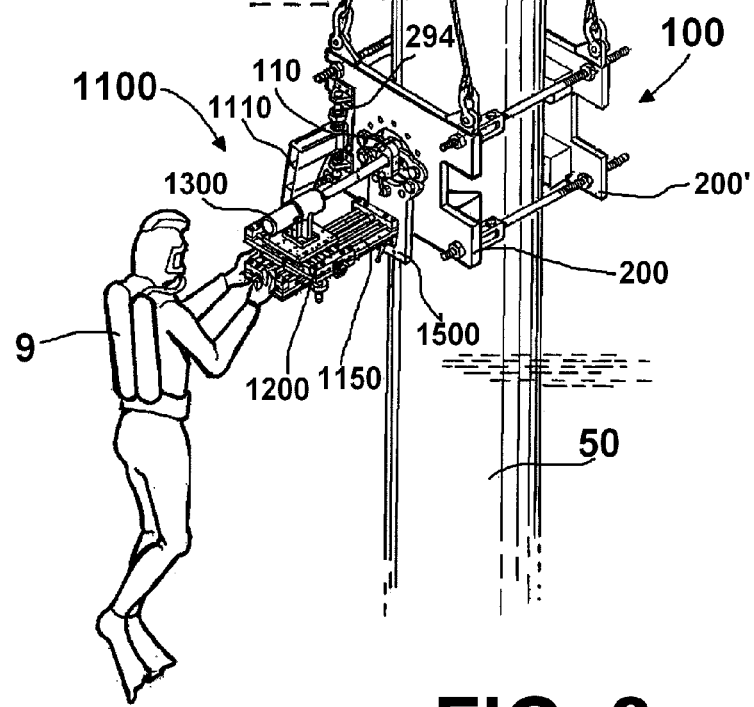
FIG. 8 shows the saw attached to the hot tap housing and positioned to make a cut in one of the nested tubulars.
Figure 9:
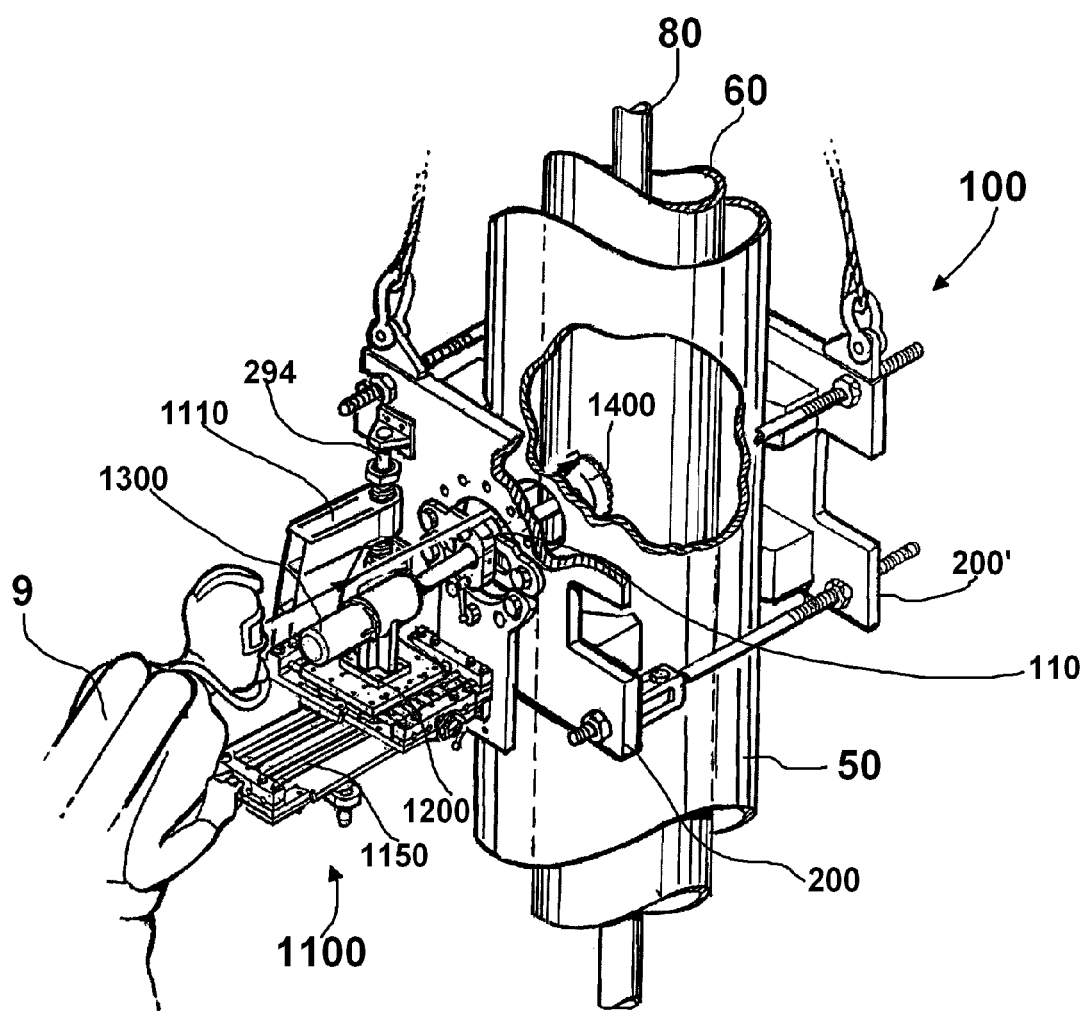
FIG. 9 is a perspective view of a diver using the articulating saw and the diver looking thru the stabilizer and hot tap housing for positioning the saw tip to make a cut.

FIG. 7 is a perspective view illustrating the step of lowering the articulating saw 1100 to a diver 9 for use in the hot tapping process. In FIG. 8, the diver 9 is shown attaching the articulating saw 1100 to the hot tap housing 100. The saw 1100 can be pivotally attached to the hot tap housing 100 via a pin on one side and a support plate on another side. The saw 1100 also has an articulating and sliding support join for the rotating saw shaft. FIG. 8 shows the saw 1100 attached to the hot tap housing 100 and positioned to make a cut in one of the nested tubulars 50, 60, 70, 80. FIG. 9 is a closeup perspective view of a diver 9 using the hot tap tool 2000. FIG. 8 is a perspective view of a diver 9 using the articulating saw 1100.

In one embodiment first plate 200 can comprise first side 210, second side 220, a main opening 230, and a plurality of openings 240 for supporting a compression plate. Main opening 230 is designed to allow access through first plate 200 (from first side 210 and through second side 220) (see FIGS. 2-24).

Between the steps of hot tapping nested tubulars, drill system 1100 can be swung (e.g., pivoted on pin 294) out of the way so that diver 9 can use hot tapping tool 200 without drill system 1100 being in the way. Also between steps of hot tapping nested tubulars, articulating drill system 1100 can remain attached to outside pipe 50 (e.g., by being pivotally attached to pin 294 of hot tap clamp 100 which is connected to pipe 50).

In FIGS. 14-24 and 35-45, one embodiment articulating drill system 1100 can include first arm 1110, second arm 1120, base 1150, and connection plate 1500. First arm 1110 can be pivotally connected to second arm 1120. Second arm 1120 can be pivotally connected to base 1150. Base 1150 can be pivotally connected to connection plate 1500.

Drill 1300 can be attached to base 1150. Drill 1300 can comprise motor 1320 and cutting tip 1400 which is rotationally connected to motor 1320.

Longitudinal track system 1160 can allow controlled longitudinal movement (e.g., along the longitudinal direction of base 1150) of drill 1300 such as by a screw and thread system. Track system 1160 can include a quick release/quick lock system which longitudinally locks the position of drill 1300 relative to base 1150.

Perpendicular track system 1200 can allow controlled perpendicular movement (e.g., perpendicular to the longitudinal direction of base 1150) of drill 1300 such as by a screw and thread system. Track system 1200 can include a quick release/quick lock system which perpendicularly locks the position of drill 1300 relative to base 1150.

Longitudinal and perpendicular track systems 1160 and 1200 can respectively longitudinally and perpendicularly adjust the position of drill 1300 and tip 1400.

Drill system 1100 can be pivotally connected to first plate 200, such as by pin 294.

Connection plate 1500 can be used to partially positionally lock drill system 1100 relative to first plate 200. Even when partially locked, drill 1300 can be pivoted relative to first plate 200 through pivoting joint 1510. Quick release/quick lock 1550 when unlocked allows for pivoting. However, locking quick release/quick lock 1550 prevents further pivoting movement of drill 1300.

Figure 10:
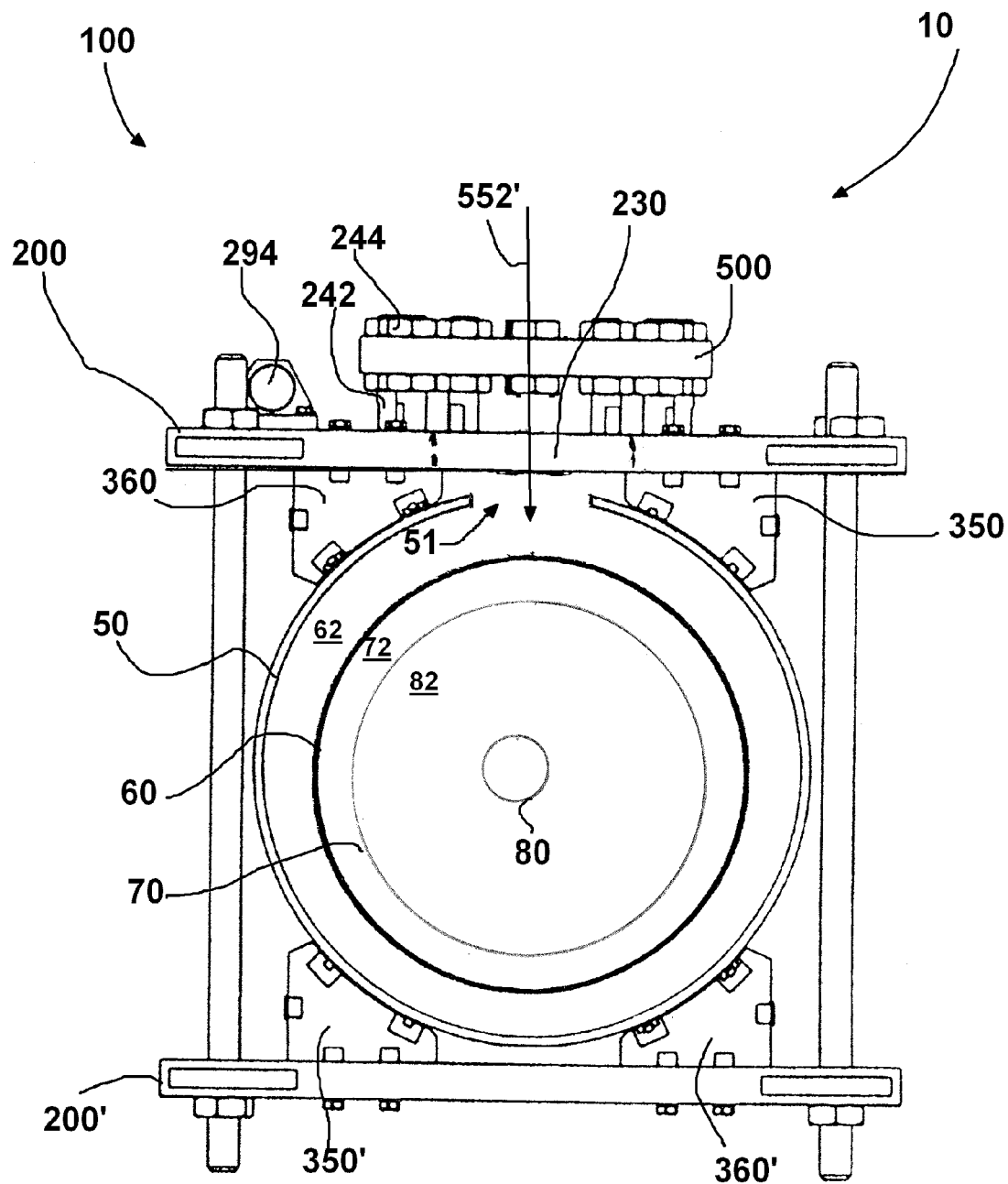
FIG. 10 is a schematic partial top view of one embodiment illustrating the step of making an opening in a first exterior pipe.

FIG. 10 is a schematic top view schematically illustrating the step of making an opening 51 in the first exterior pipe 50.

Figure 11:
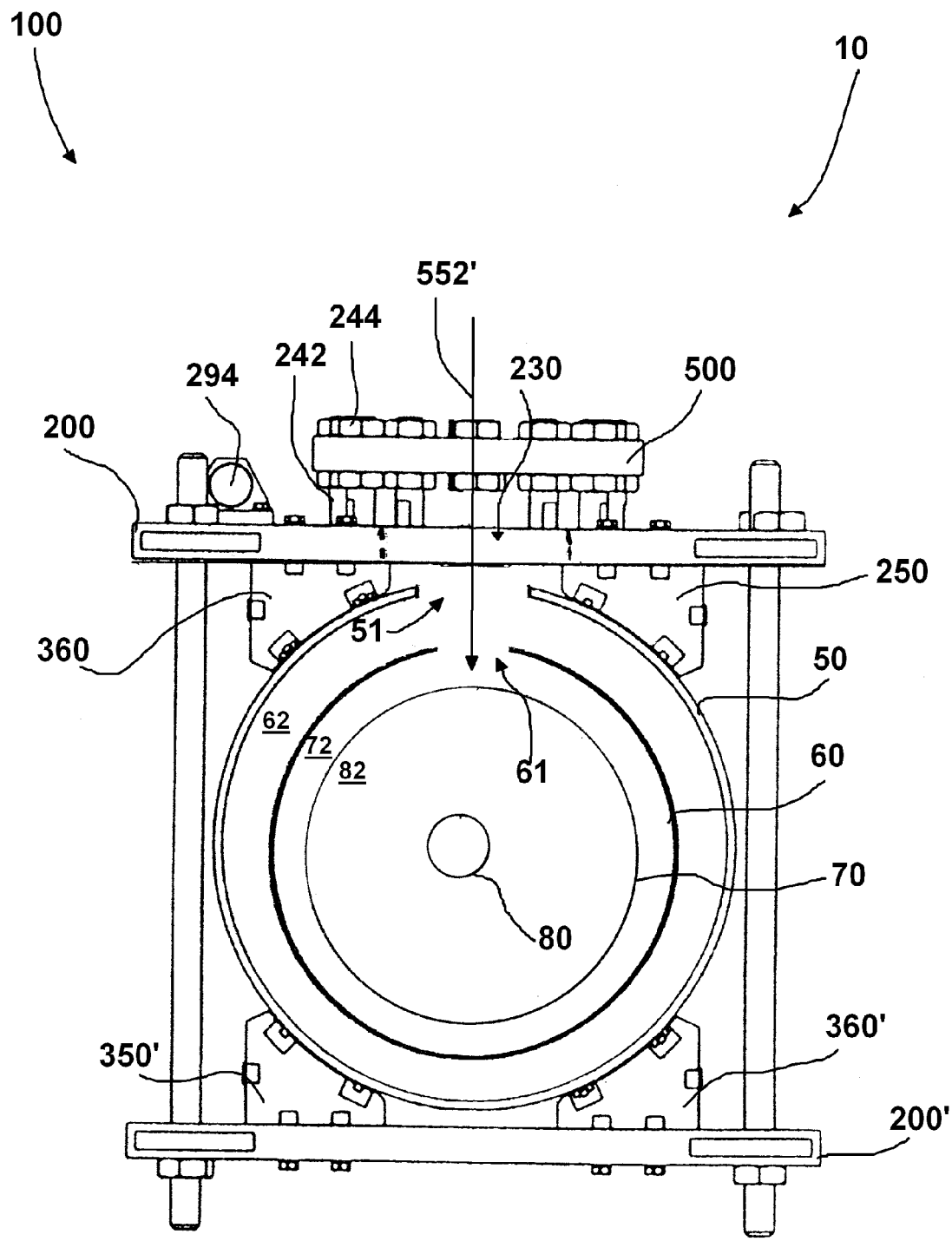
FIG. 11 is a schematic top view of the embodiment shown in FIG. 10 schematically illustrating the step of making an opening in the second pipe.

FIG. 11 is a schematic top view schematically illustrating the step of making an opening 61 in the second pipe 60.

Figure 12:
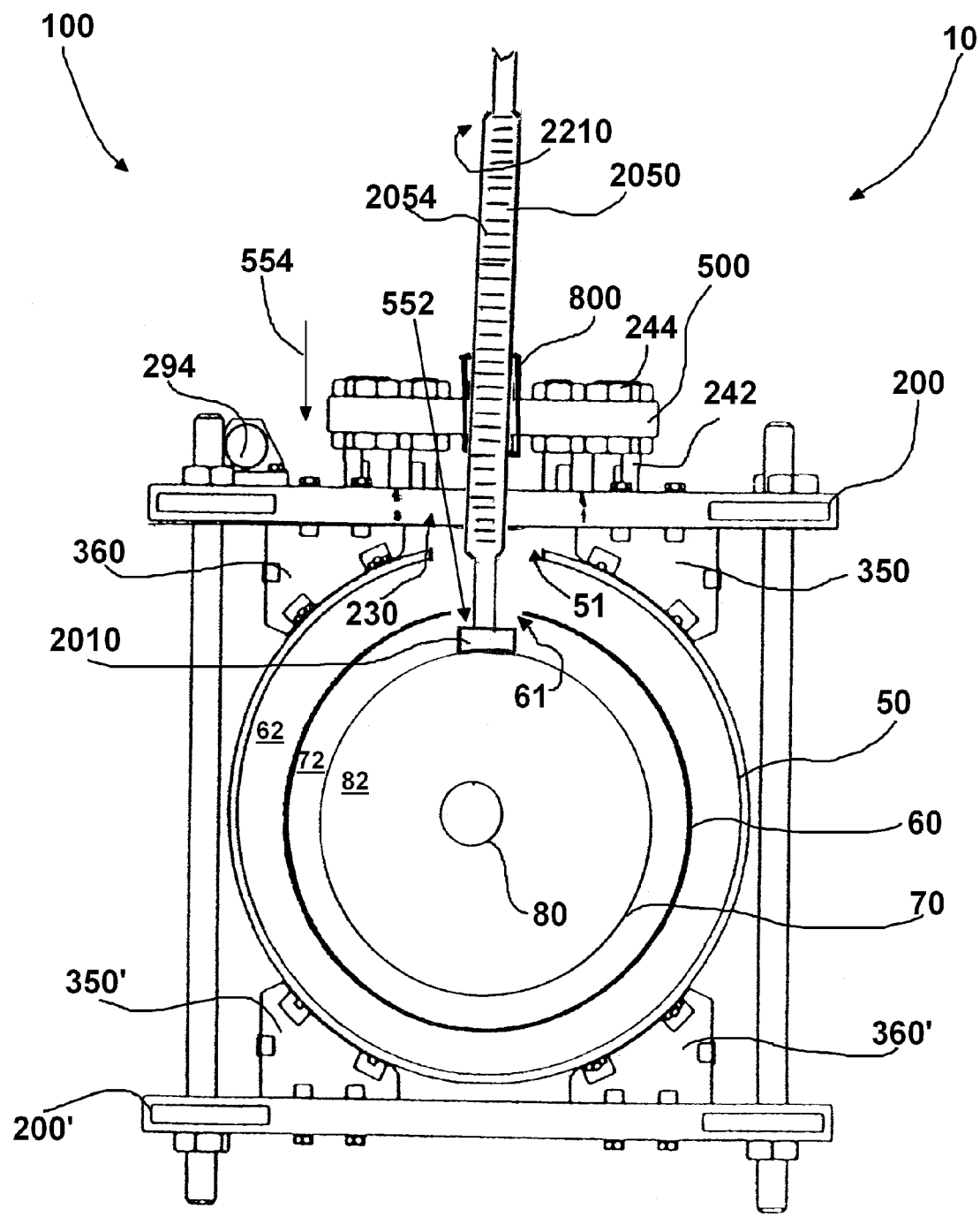
FIG. 12 is a schematic top view of the embodiment shown in FIG. 10 illustrating the step of hot tapping of a third interior pipe.

FIG. 12 is a schematic top view of hot tapping system 10 illustrating the step of hot tapping a third interior pipe 70.

Figure 13:
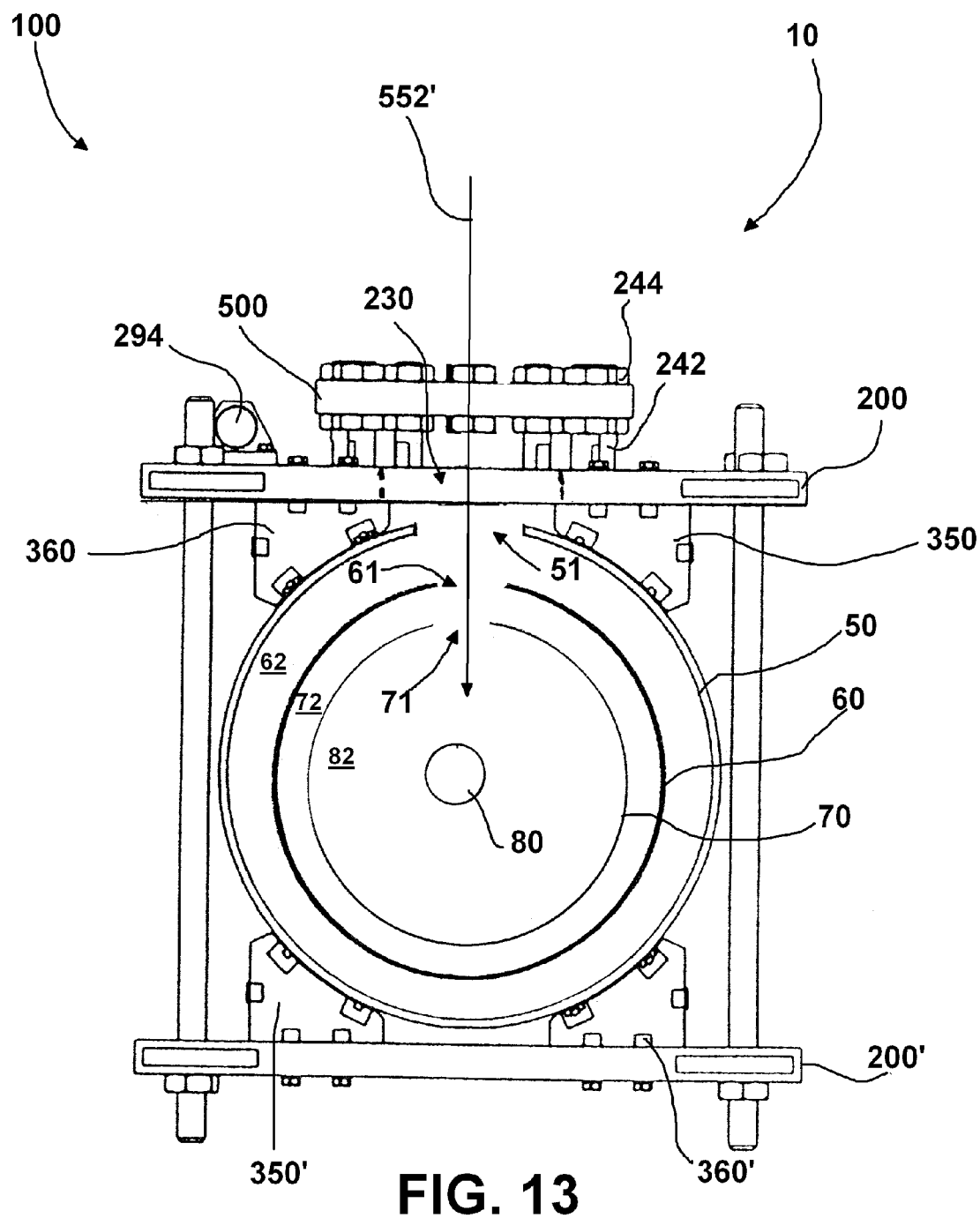
FIG. 13 is a schematic top view of the embodiment shown in FIG. 10 schematically illustrating the step of making an opening in the third pipe.

FIG. 13 is a schematic top view of system 10 illustrating the step of hot tapping a fourth pipe or tubing 80 where the hot tapping tool 2000 is angularly offset (by angle theta) from a perpendicular to assist in making the hot tapping seal between the tip 2010 and the pipe 80, along with the step of using a second tool 3000 to provide support for the tubing 80 when making a seal between the hot tapping tool tip 2010 and the tubing 80.

Figure 14:
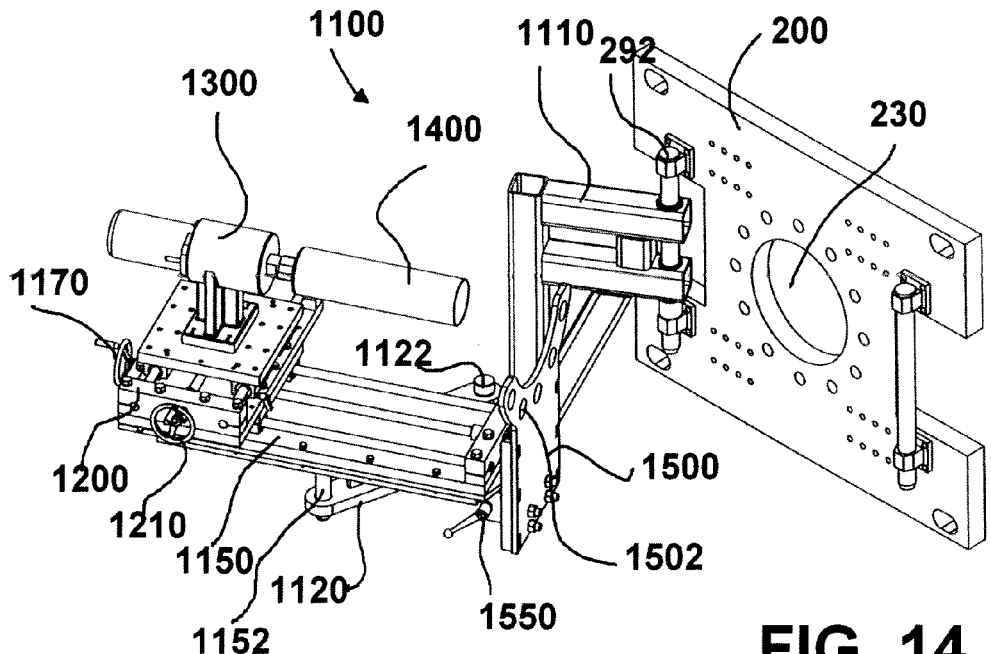
FIG. 14 is a perspective view of one embodiment of an articulating drill system where the system is swung away from the plate.
Figure 15:
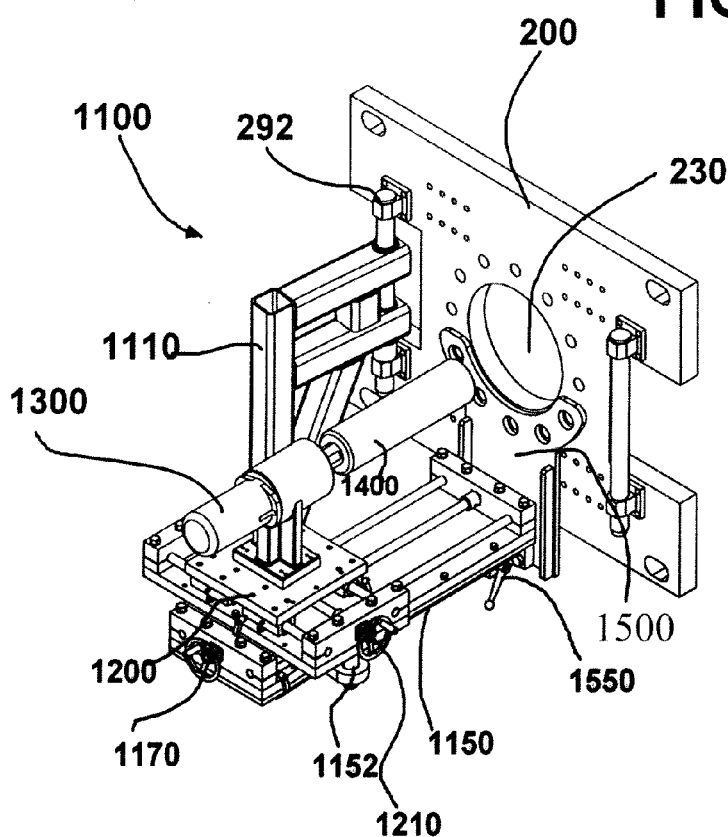
FIG. 15 is a perspective view of the articulating drill system of FIG. 14 where the system is connected to the plate, perpendicular to same and in the center of main plate opening.

FIGS. 14-15 are perspective views of one embodiment of an articulating drill system 1100 for making openings through the different pipes with drill system 1100 shown swiveled out of the way of the clamp 100.

Figure 16:
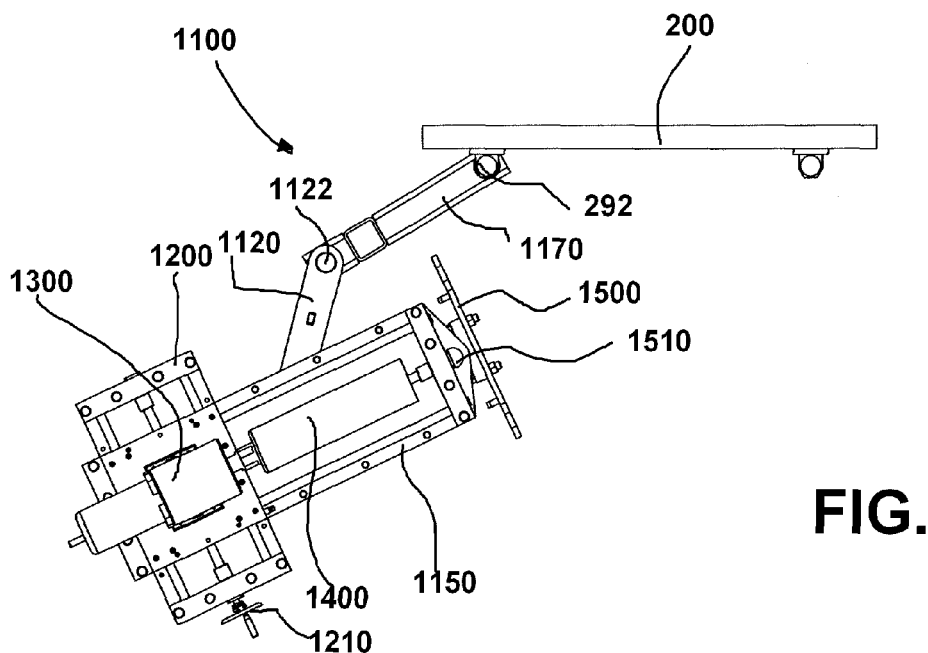
FIG. 16 is a top view of the articulating drill system of FIG. 14.
Figure 17:
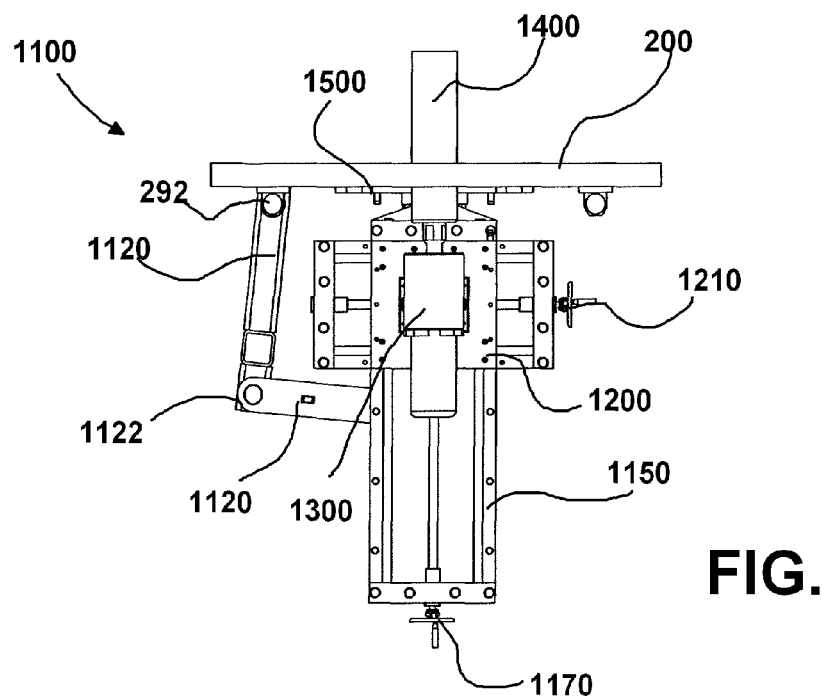
FIG. 17 is a top view of the articulating drill system of FIG. 14 where the system is connected to the plate, perpendicular to same and in the center of main plate opening with the drill tip having passed through main plate opening.

FIG. 16 is a top view of the articulating drill system 1100 shown in the same position as FIG. 14. FIG. 17 is a top view of the articulating drill 100 in the position of FIG. 15.

Figure 18:
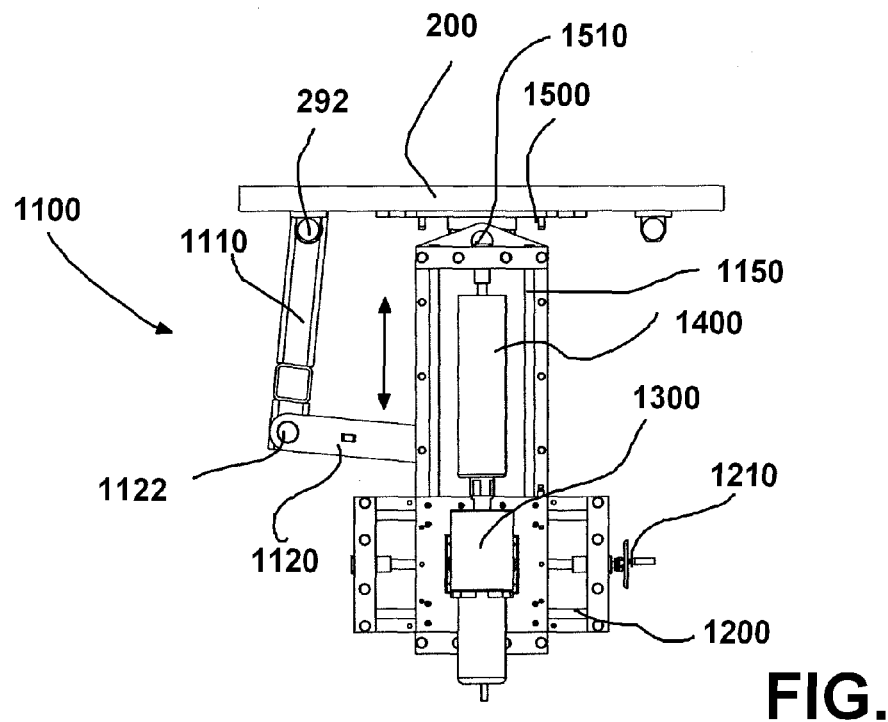
FIG. 18 is a top view of the articulating drill system of FIG. 14 where the system is connected to the plate, perpendicular to same and in the center of main plate opening with the double arrow schematically indicating that drill tip can move back and forth through main plate opening.

FIG. 18 is a top view of articulating drill system 1100 with the double arrows indicating that drill tip 1400 can move back and forth through plate 200.

Figure 19:
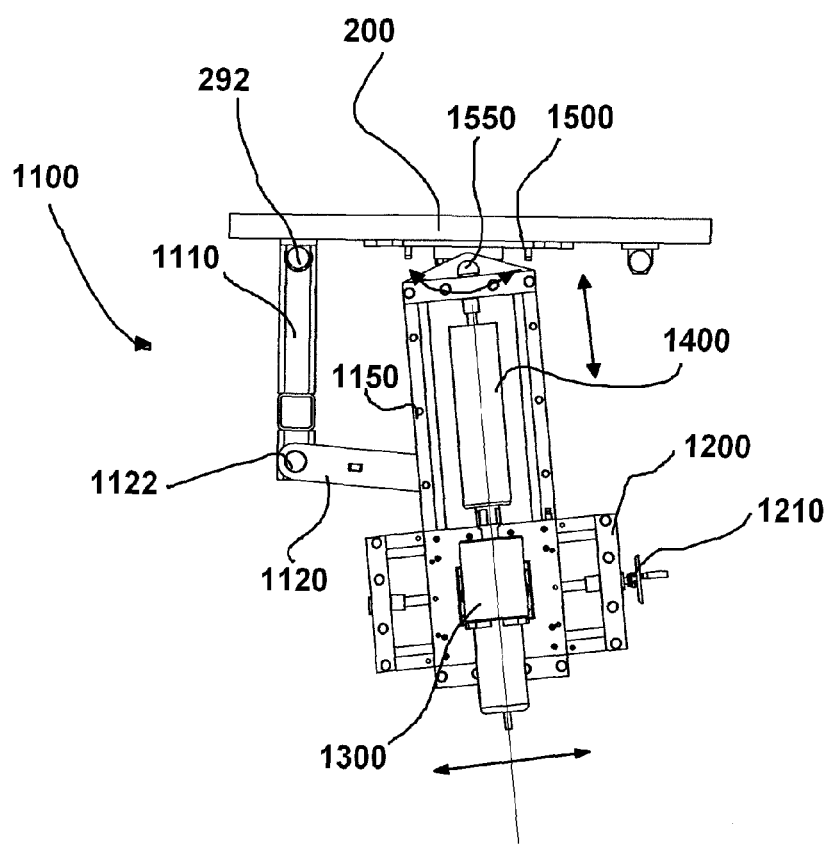
FIG. 19 is a top view of the articulating drill system of FIG. 14 where the system is connected to the plate, angled from same and in the center of main plate opening with the two sets of double arrows schematically indicating that drill tip can move back and forth through main plate opening along with rotating back and forth.

FIG. 19 is a top view of articulating drill system 1100 where the drill tip 1400 has been angled from a perpendicular and the drill tip 1400 has been moved in a position to make a cut at such angle.

Figure 20:
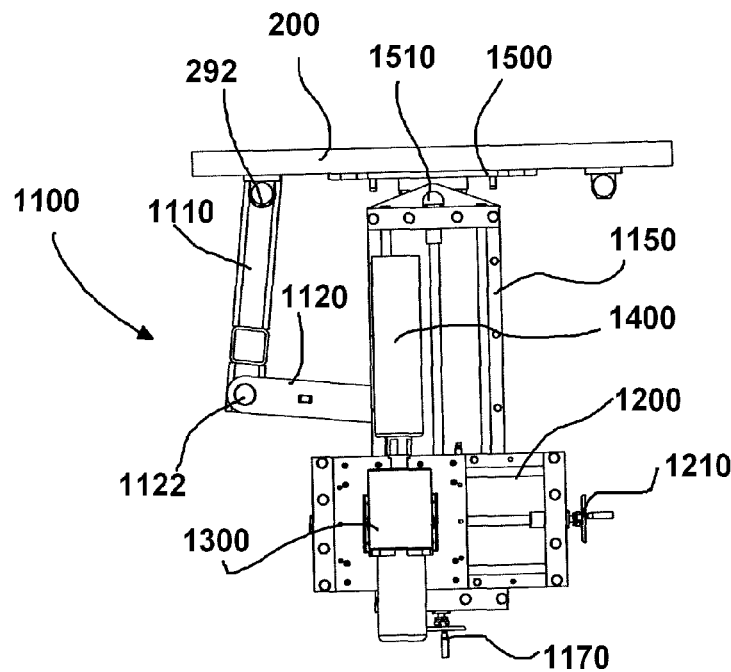
FIG. 20 is a top view of the articulating drill system of FIG. 16 where the system is connected to the plate, perpendicular to same and offset in the left direction of the arrow from the center of main plate opening.

FIG. 20 is a top view of the articulating drill system 1100 where the system is connected to the plate 200, perpendicular to same and offset in the left direction of the arrow from the center of main plate opening 230.

Figure 21:
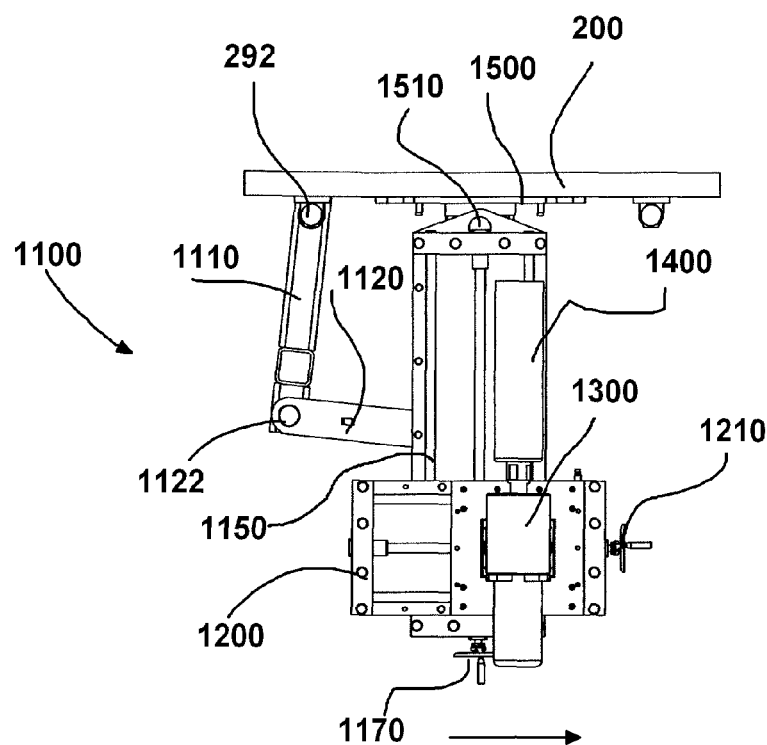
FIG. 21 is a top view of the articulating drill system of FIG. 16 where the system is connected to the plate, perpendicular to same and offset in the right direction of the arrow from the center of main plate opening.

FIG. 21 is a top view of the articulating drill system 1100 where the system is connected to the plate 200, perpendicular to same and offset in the right direction of the arrow from the center of main plate opening 230.

Figure 22:
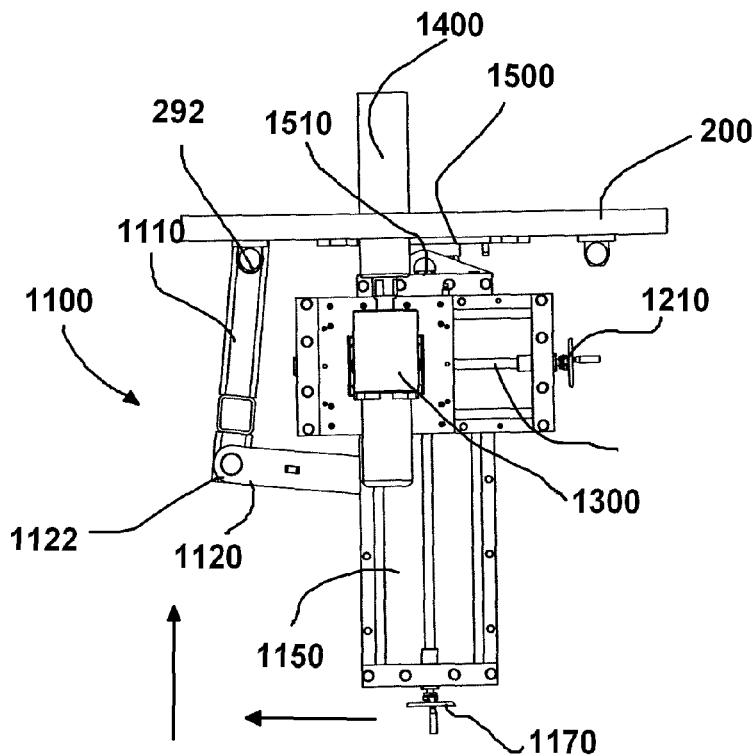
FIG. 22 is a top view of the articulating drill system of FIG. 16 where the system is connected to the plate, perpendicular to same and offset in the left direction of the arrow from the center of main plate opening and the drill tip is passed through the main opening.

FIG. 22 is a top view of the articulating drill system 1100 where the system is connected to the plate, perpendicular to same and offset in the left direction of the arrow from the center of main plate opening 230 and the drill tip 1400 is passed through the main opening 230.

Figure 23:
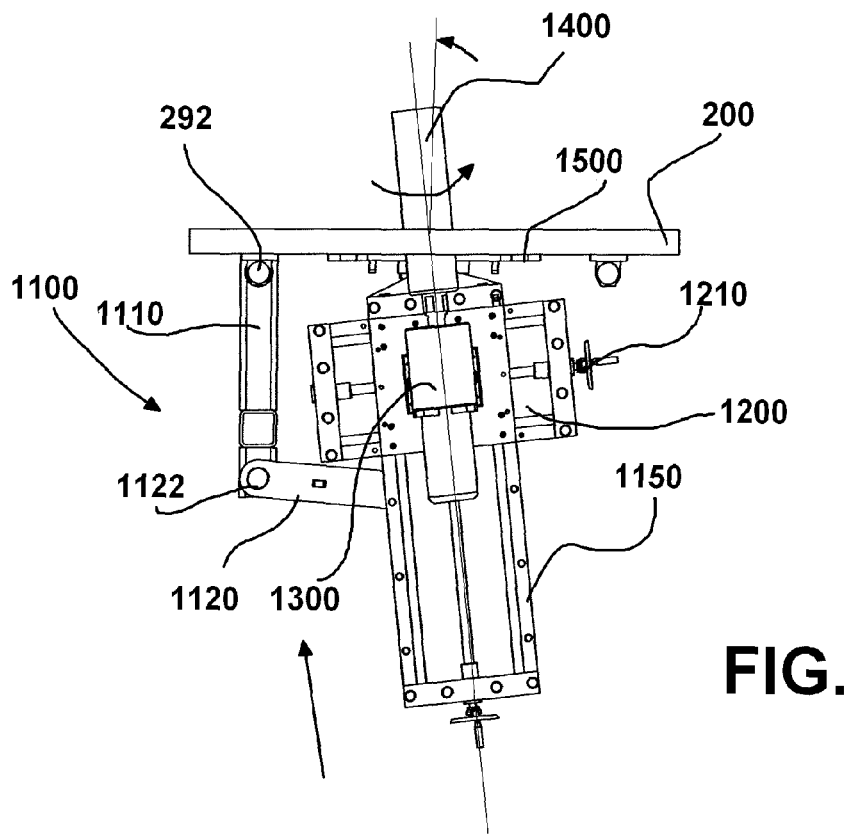
FIG. 23 is a top view of the articulating drill system of FIG. 16 where the system is connected to the plate, angled from a perpendicular to same as indicated by the arrows, where and the drill tip is passed through the main opening.

FIG. 23 is a top view of the articulating drill system 1100 where the system is connected to the plate 200, angled from a perpendicular to same as indicated by the arrows, where and the drill tip 1400 is passed through the main opening 230.

Figure 24:
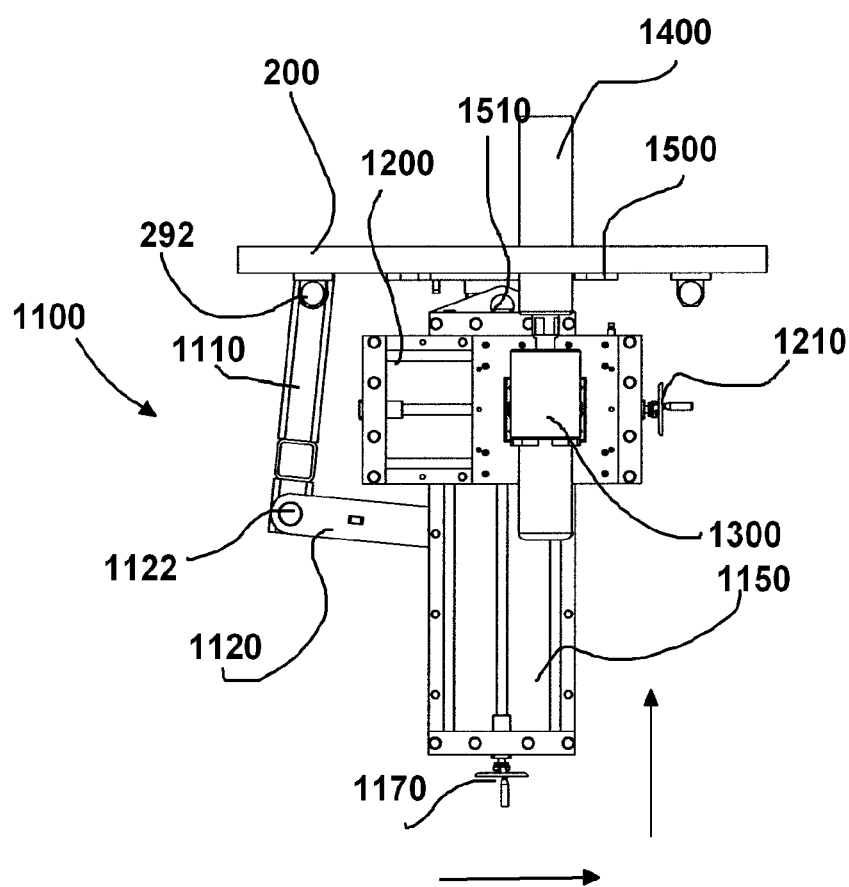
FIG. 24 is a top view of the articulating drill system of FIG. 16 where the system is connected to the plate, perpendicular to same and offset in the right direction of the arrow from the center of main plate opening and the drill tip is passed through the main opening.

FIG. 24 is a top view of the articulating drill system 1100 where the system is connected to the plate 200, perpendicular to same and offset in the right direction of the arrow from the center of main plate opening 230 and the drill tip 1400 is passed through the main opening 230.

Figure 25:
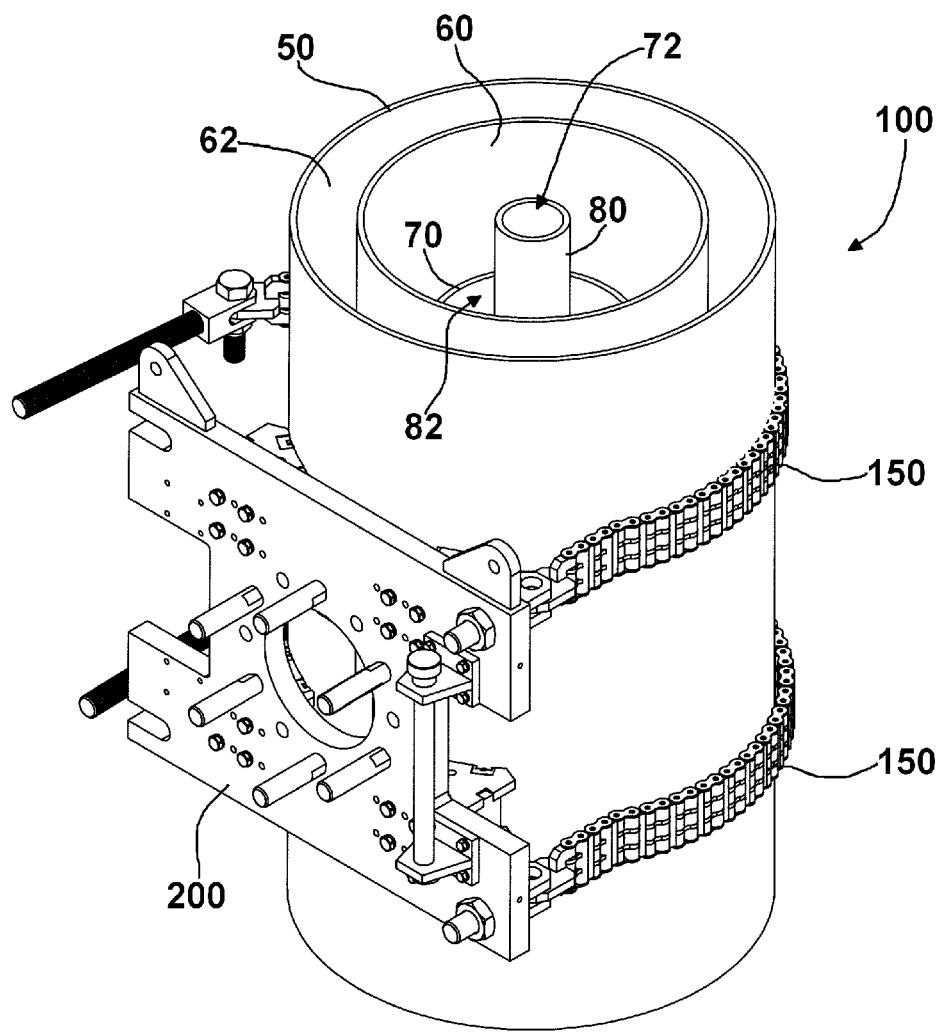
FIG. 25 is a perspective view showing a hot tap housing being placed on the riser piping system.
Figure 26:
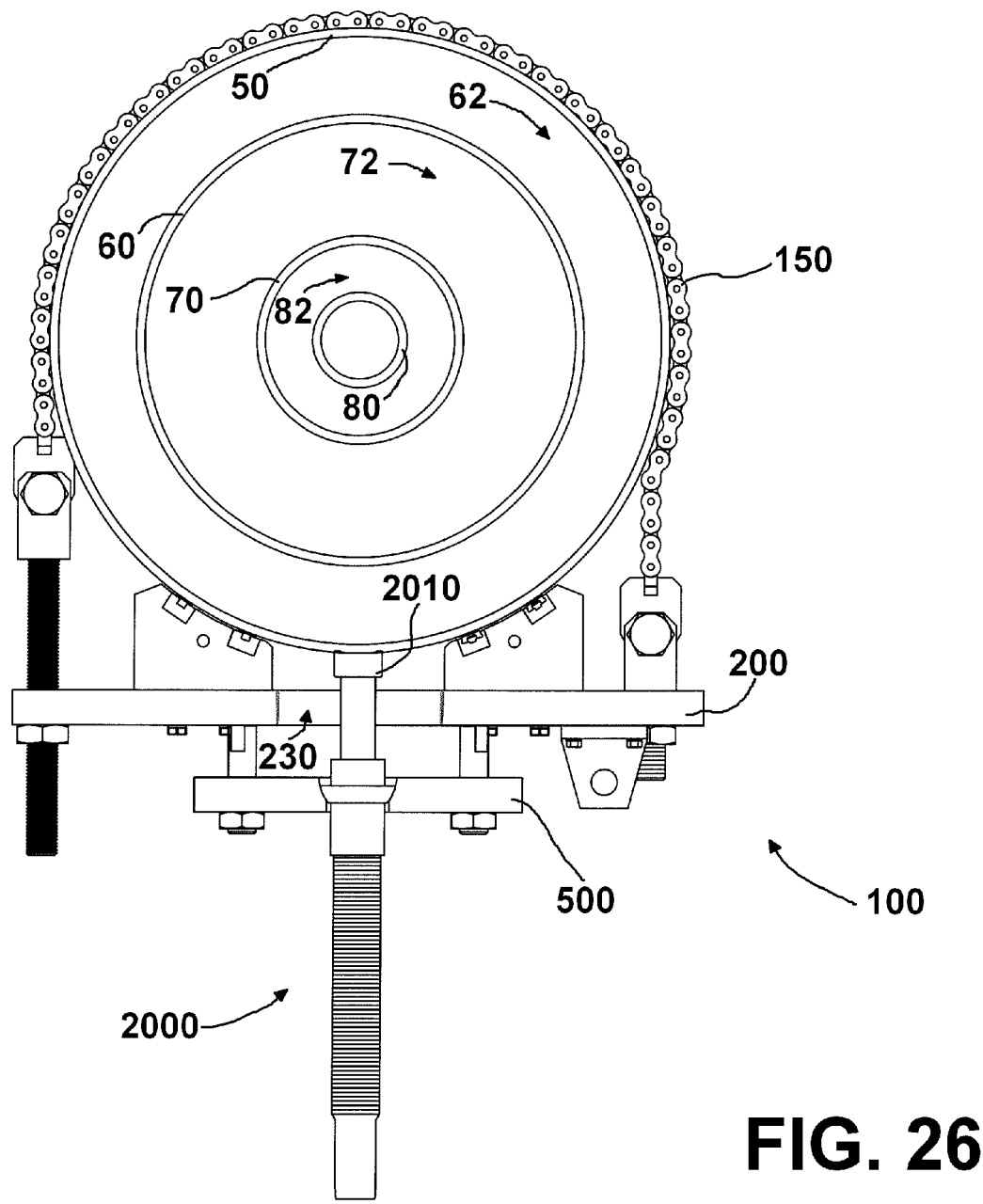
FIG. 26 is a schematic top view of the embodiment shown in FIG. 25 illustrating the step of hot tapping of a first exterior pipe.

FIG. 25 is a perspective view showing a hot tap housing 100 being placed on the riser piping system. FIG. 26 is a schematic top view of hot tap housing 100 generally illustrating the step of hot tapping of a first exterior pipe 50.

Figure 27:
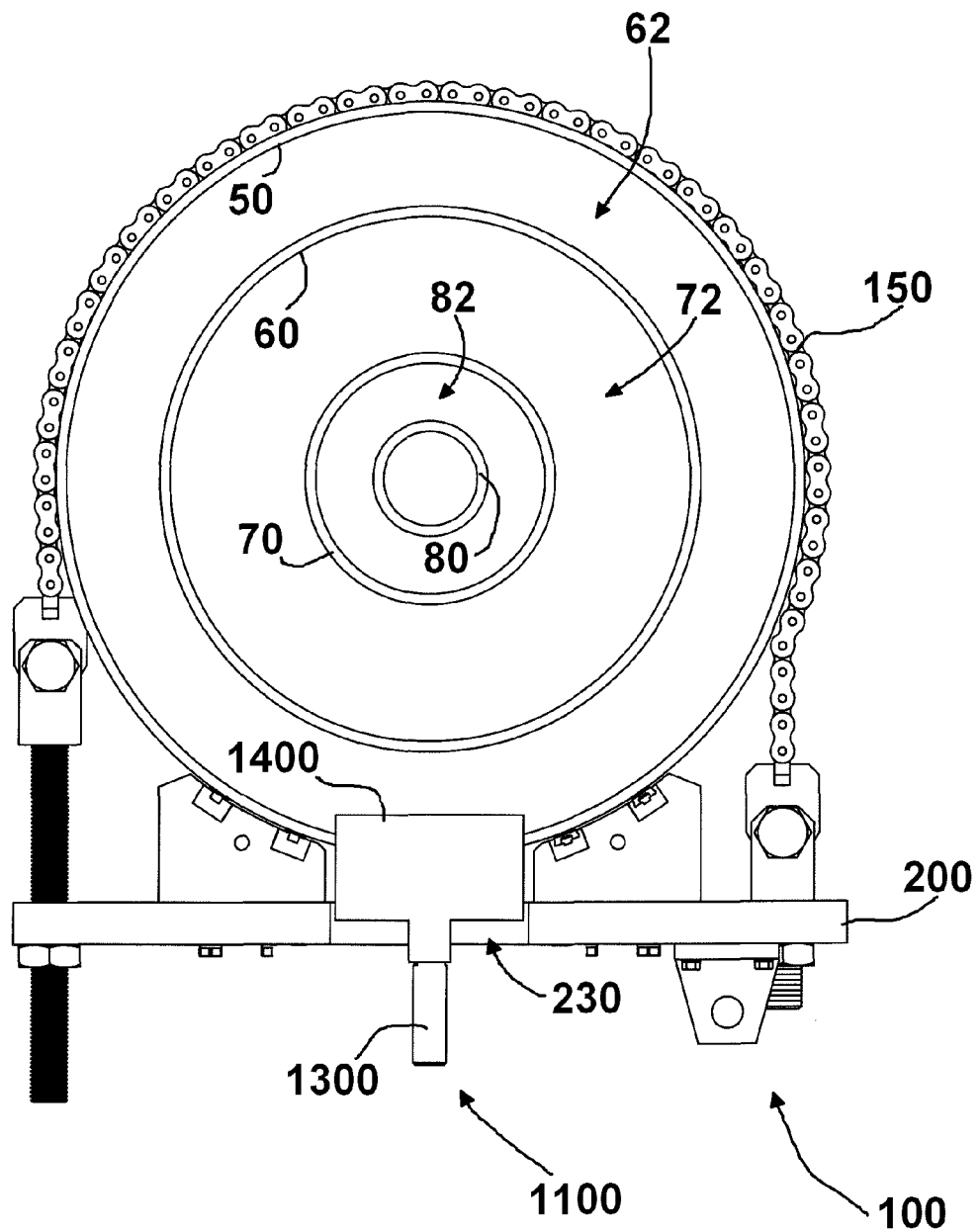
FIG. 27 is a schematic top view of the embodiment shown in FIG. 25 schematically illustrating the step of making an opening in the first exterior pipe.

FIG. 27 is a schematic top view of articulating saw system 1100 schematically illustrating the step of making an opening in the first exterior pipe 50.

Figure 28:
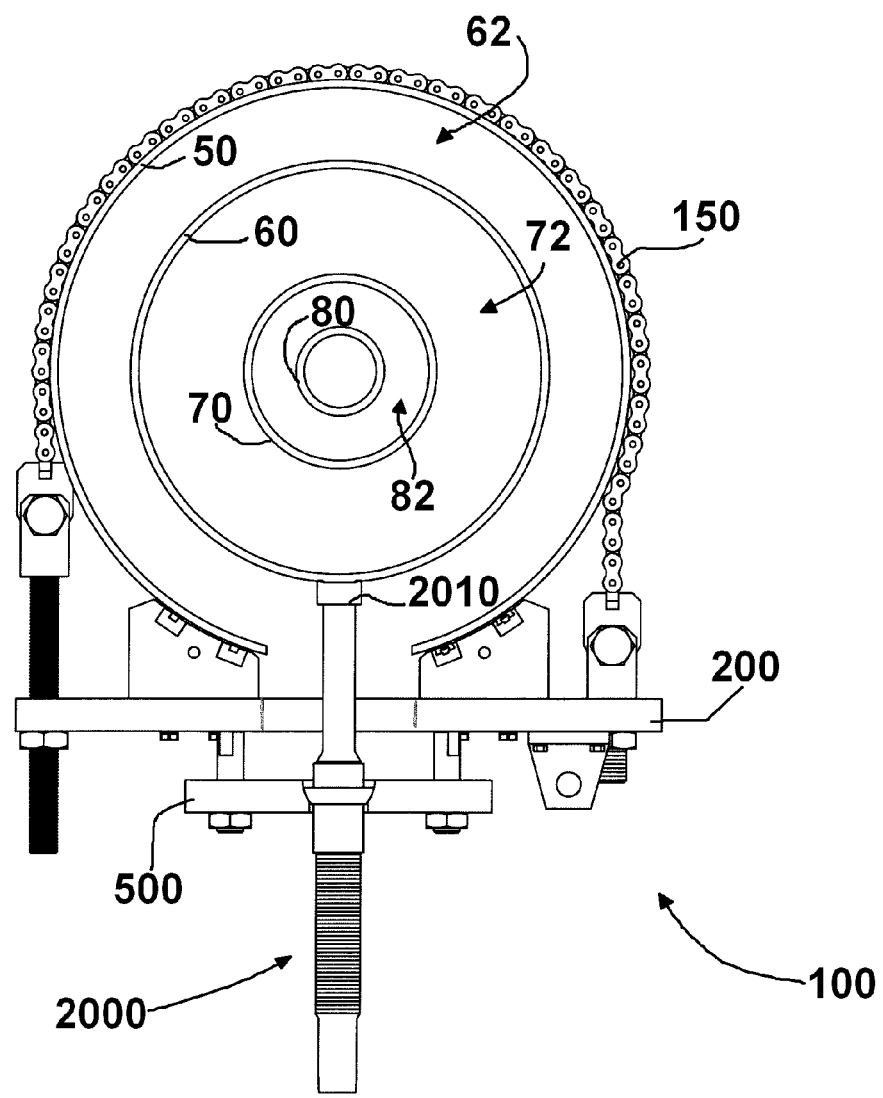
FIG. 28 is a schematic top view of the embodiment shown in FIG. 25 illustrating the step of hot tapping of a second interior pipe wherein the second interior pipe is concentrically located within the first pipe.
Figure 29:
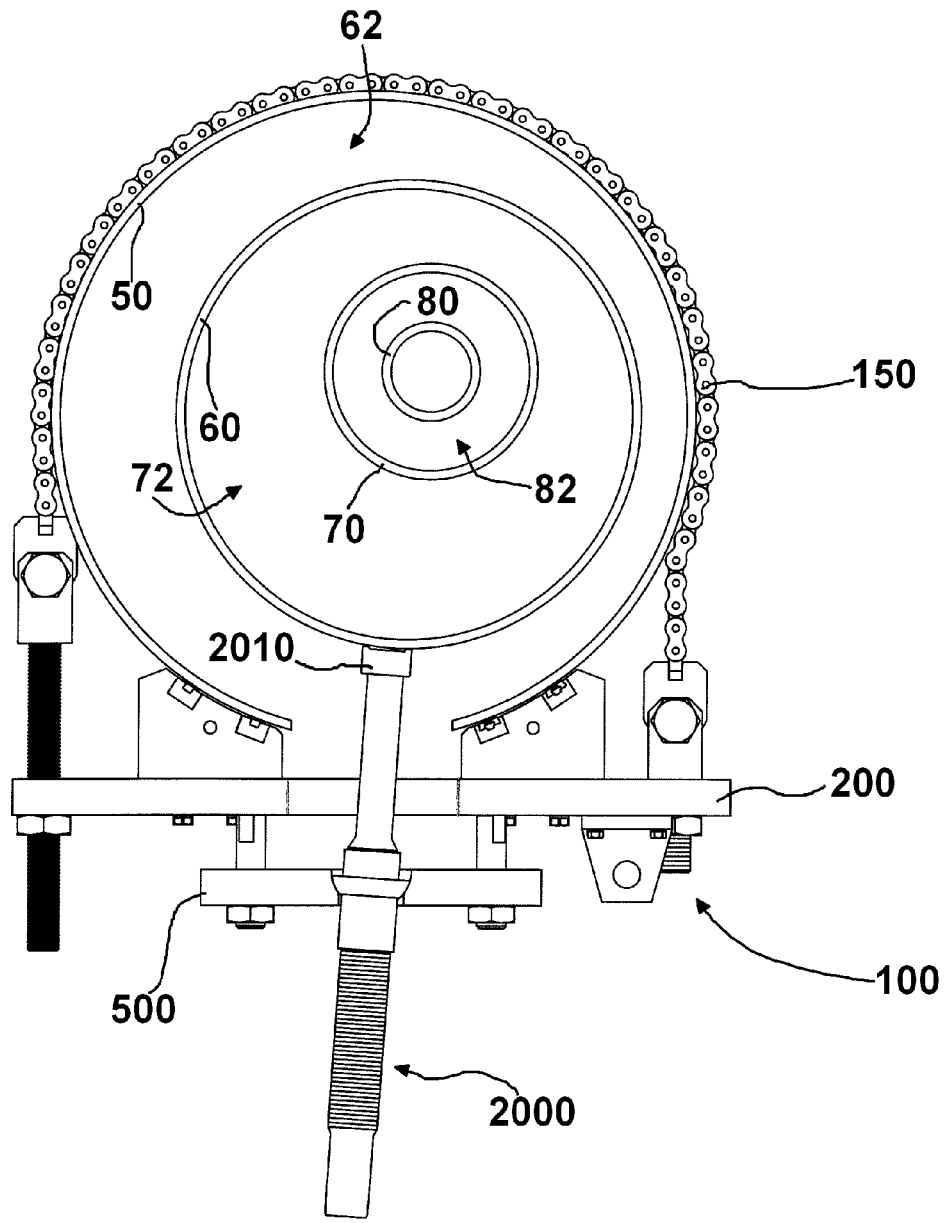
FIG. 29 is a schematic top view of the embodiment shown in FIG. 25 illustrating the step of hot tapping of a second interior pipe wherein the second interior pipe is non-concentrically located (angularly offset from a perpendicular) within the first pipe.

FIG. 28 is a schematic top view of a hot tap housing 100 illustrating the step of hot tapping of a second interior pipe 60 wherein the second interior pipe is concentrically located within the first pipe. FIG. 29 is a schematic top view of hot tap housing 100 illustrating the step of hot tapping of a second interior pipe 60 wherein the second interior pipe 60 is non-concentrically located (angularly offset from a perpendicular) within the first pipe 50.

Figure 30:
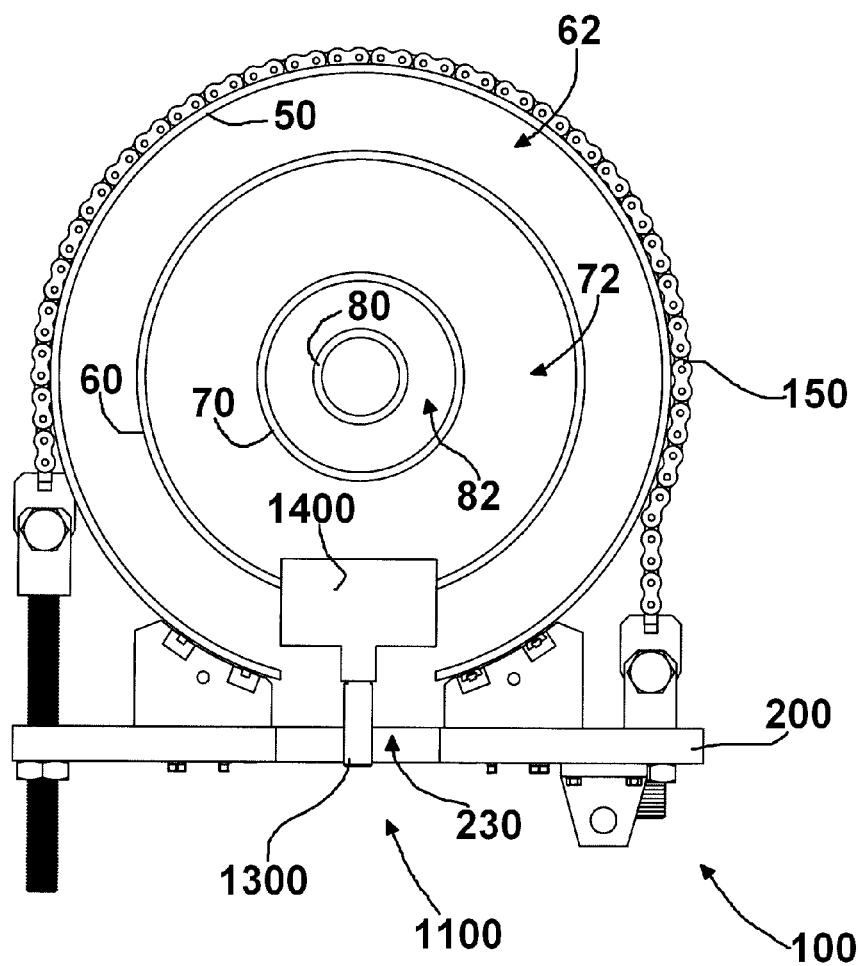
FIG. 30 is a schematic top view of the embodiment shown in FIG. 25 schematically illustrating the step of making an opening in the second pipe.

FIG. 30 is a schematic top view of the articulating saw system 1100 schematically illustrating the step of making an opening in the second pipe 60.

Figure 31:
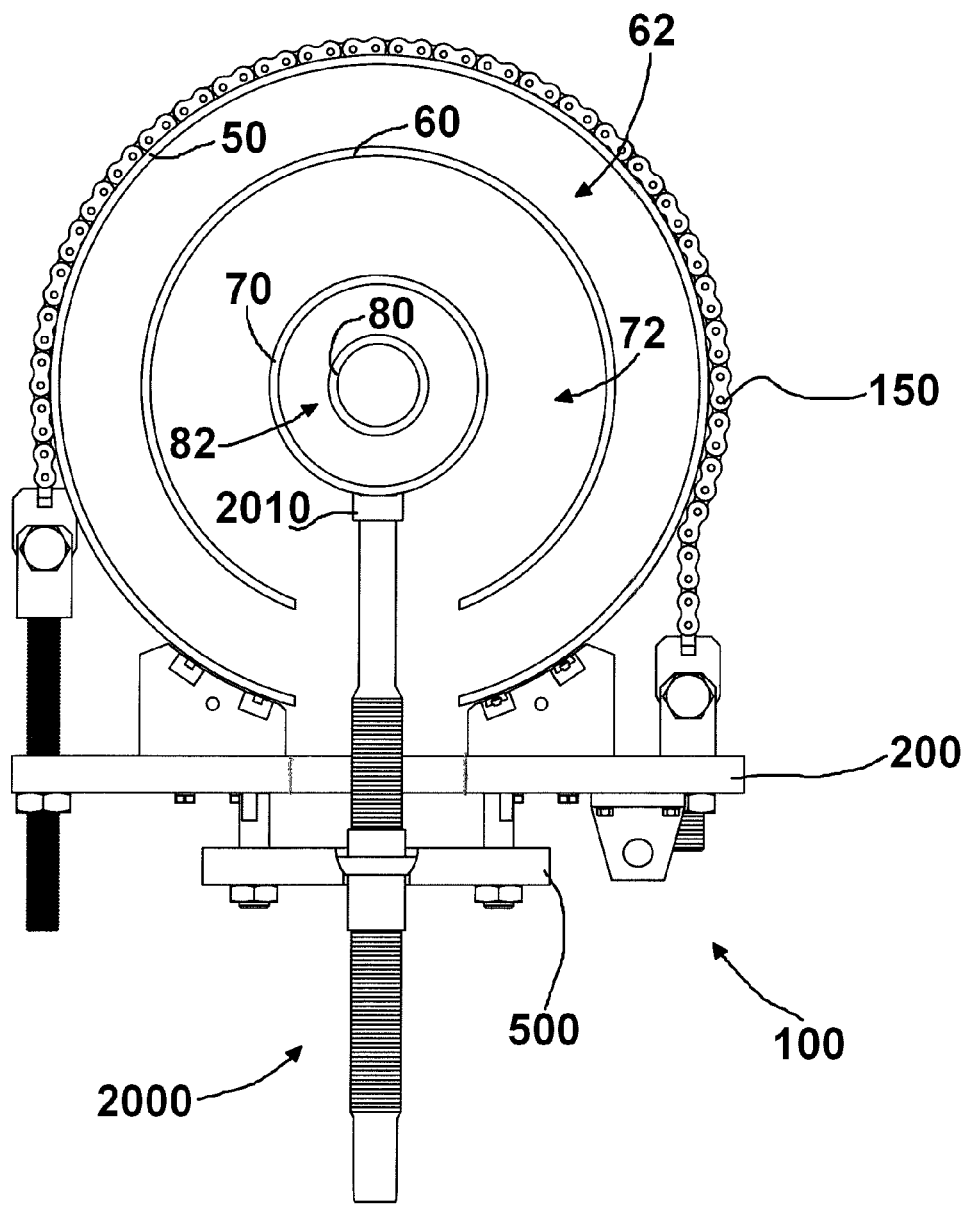
FIG. 31 is a schematic top view of the embodiment shown in FIG. 25 illustrating the step of hot tapping of a third interior pipe wherein the third interior pipe is concentrically located within the first pipe.
Figure 32:
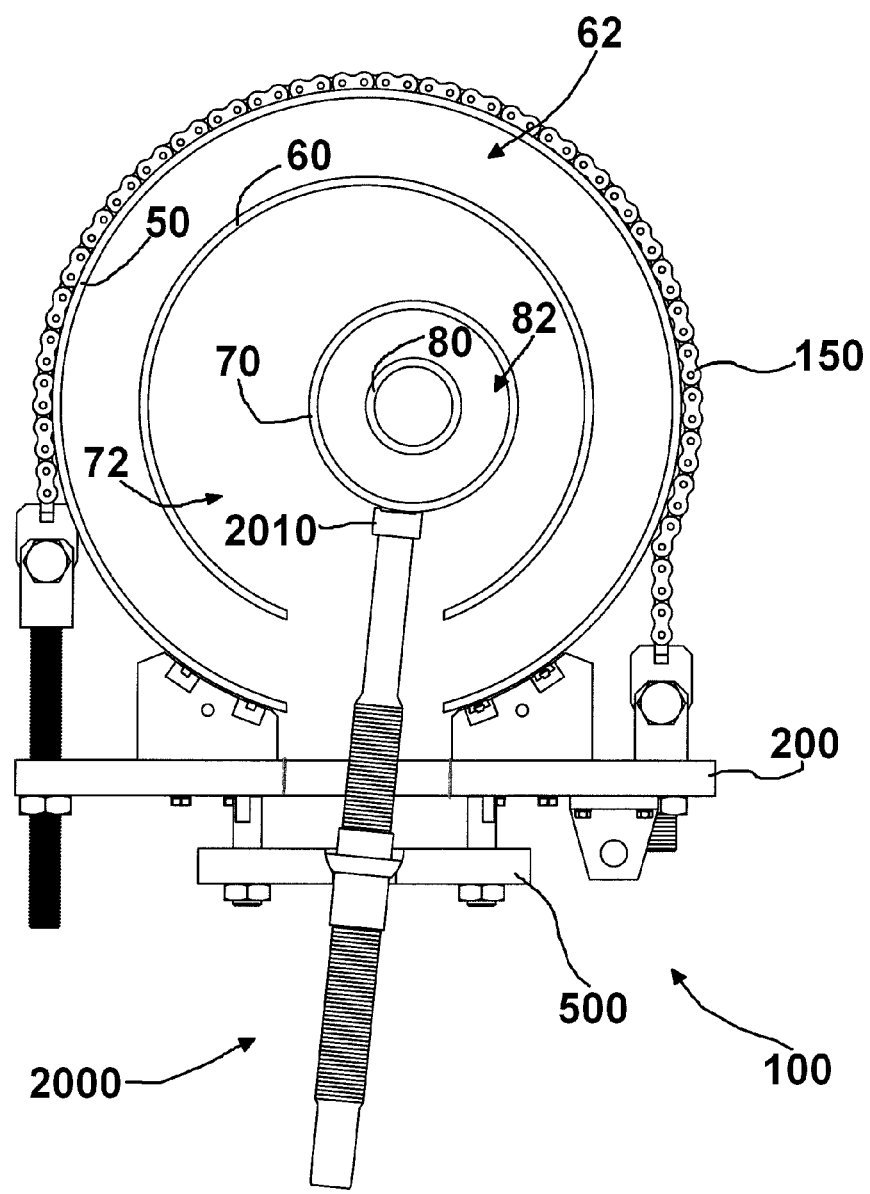
FIG. 32 is a schematic top view of the embodiment shown in FIG. 25 illustrating the step of hot tapping of a third interior pipe wherein the third interior pipe is non-concentrically located (angularly offset from a perpendicular) within the first pipe.

FIG. 31 is a schematic top view showing hot tap housing 100 hot tapping a third interior pipe 70 wherein the third interior pipe 70 is concentrically located within the first pipe 50. FIG. 32 schematically shows hot tap housing being used to hot tap third interior pipe 70 wherein the third interior pipe 70 is non-concentrically located (angularly offset from a perpendicular) within the first pipe 50.

Figure 33:
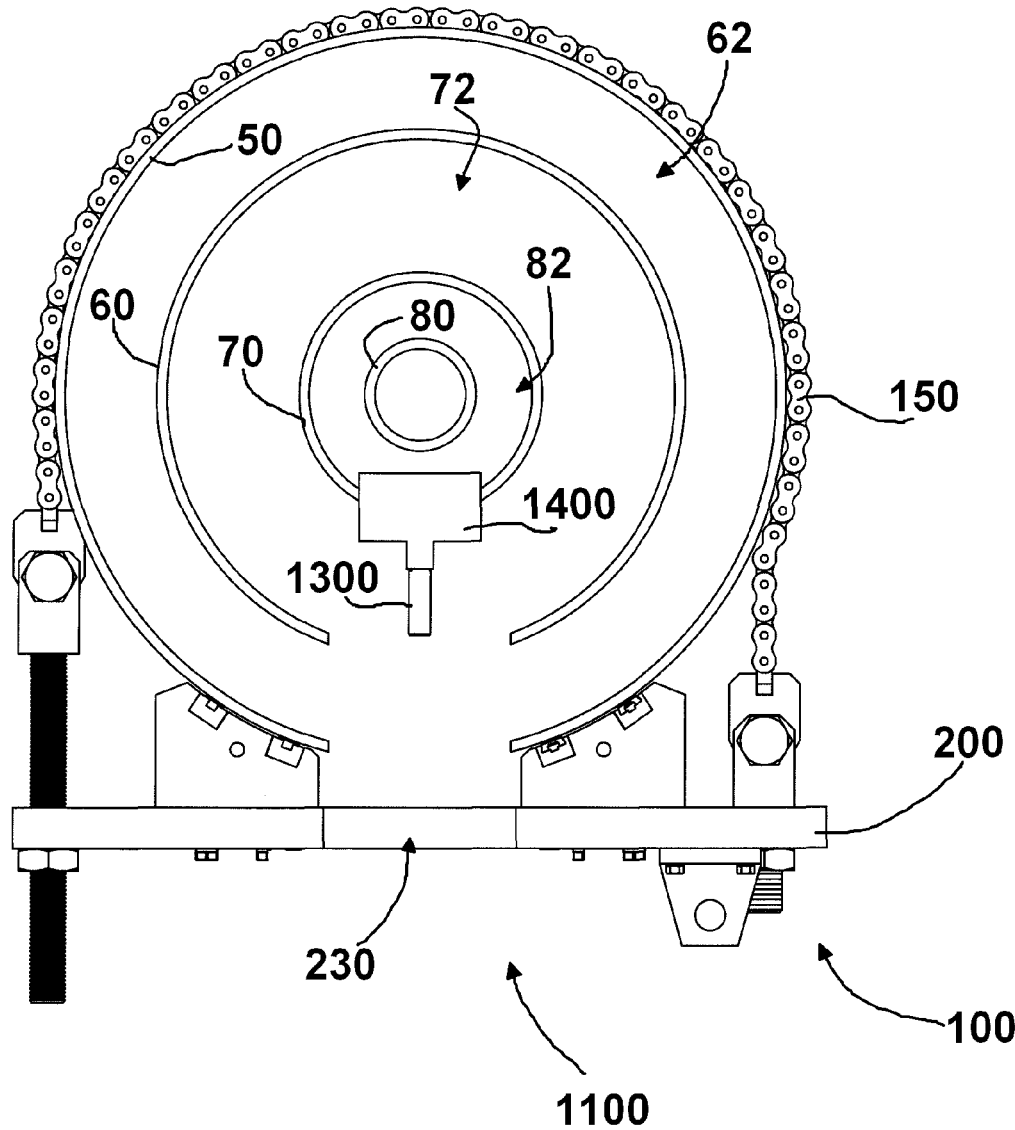
FIG. 33 is a schematic top view of the embodiment shown in FIG. 25 schematically illustrating the step of making an opening in the third pipe.

FIG. 33 is a schematic top view of articulating saw system 1100 schematically illustrating the step of making an opening in the third pipe 70.

Figure 34:
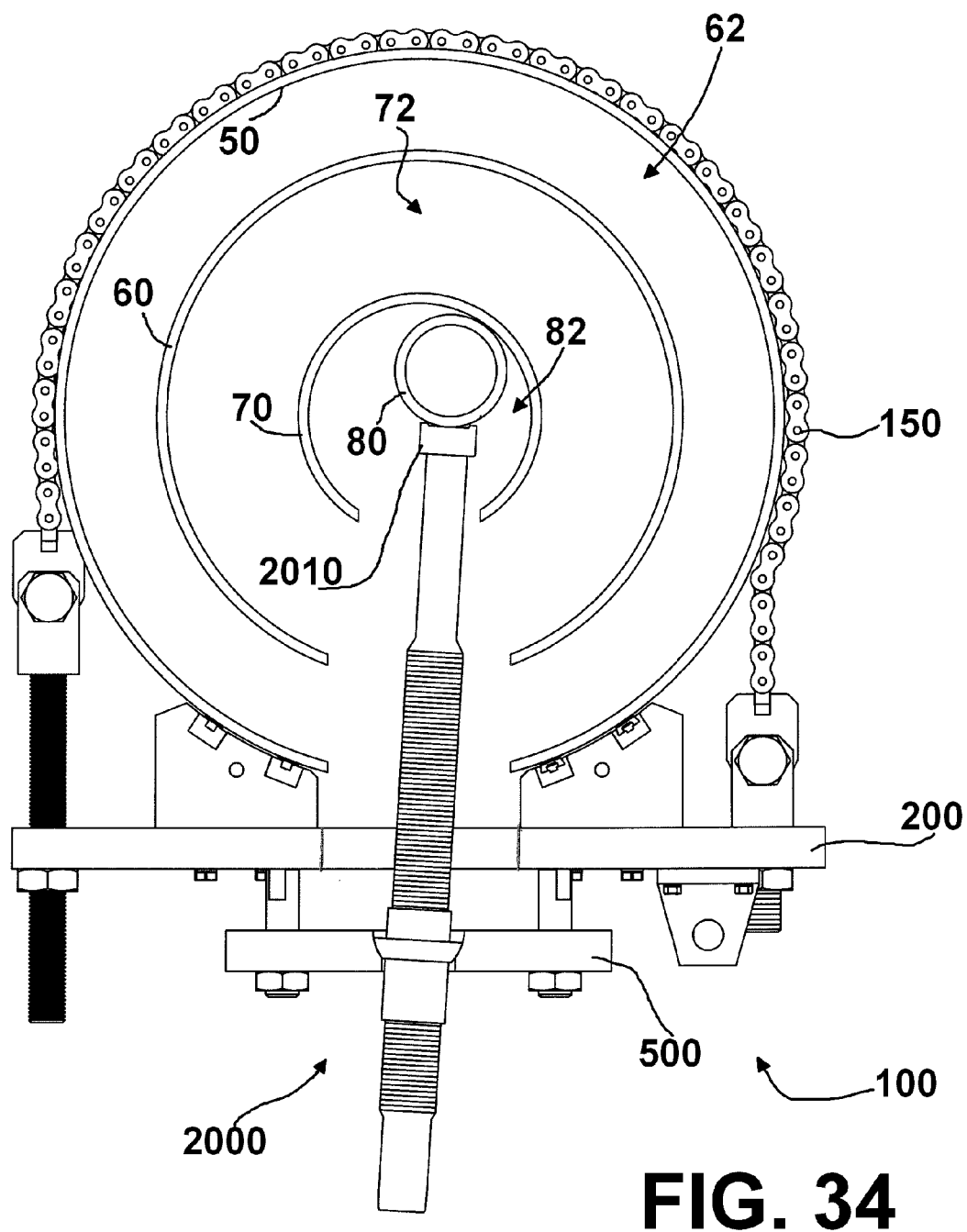
FIG. 34 is a schematic top view of the embodiment shown in FIG. 25 illustrating the step of hot tapping of a fourth pipe or tubing where the hot tapping tool is angularly offset from a perpendicular to assist in making the hot tapping seal between the tip and the pipe along with pushing the fourth pipe or tubing back, and to a location where it contacts the third interior pipe and enough backward resistance by the fourth pipe or tubing to maintain a good seal between the tip of the hot tap tool and the surface of the fourth pipe or tubing.

FIG. 34 is a schematic top view showing hot tap housing 100 illustrating the step of hot tapping of a fourth pipe or tubing 80 where the hot tapping tool 2000 is angularly offset from a perpendicular to assist in making the hot tapping seal between the tip and the pipe along with pushing the fourth pipe or tubing 80 back, and to a location where it contacts the third interior pipe 70 and enough backward resistance by the fourth pipe or tubing 80 to maintain a good seal between the tip 2010 of the hot tap tool 2000 and the surface of the fourth pipe or tubing 80.

Figure 35:
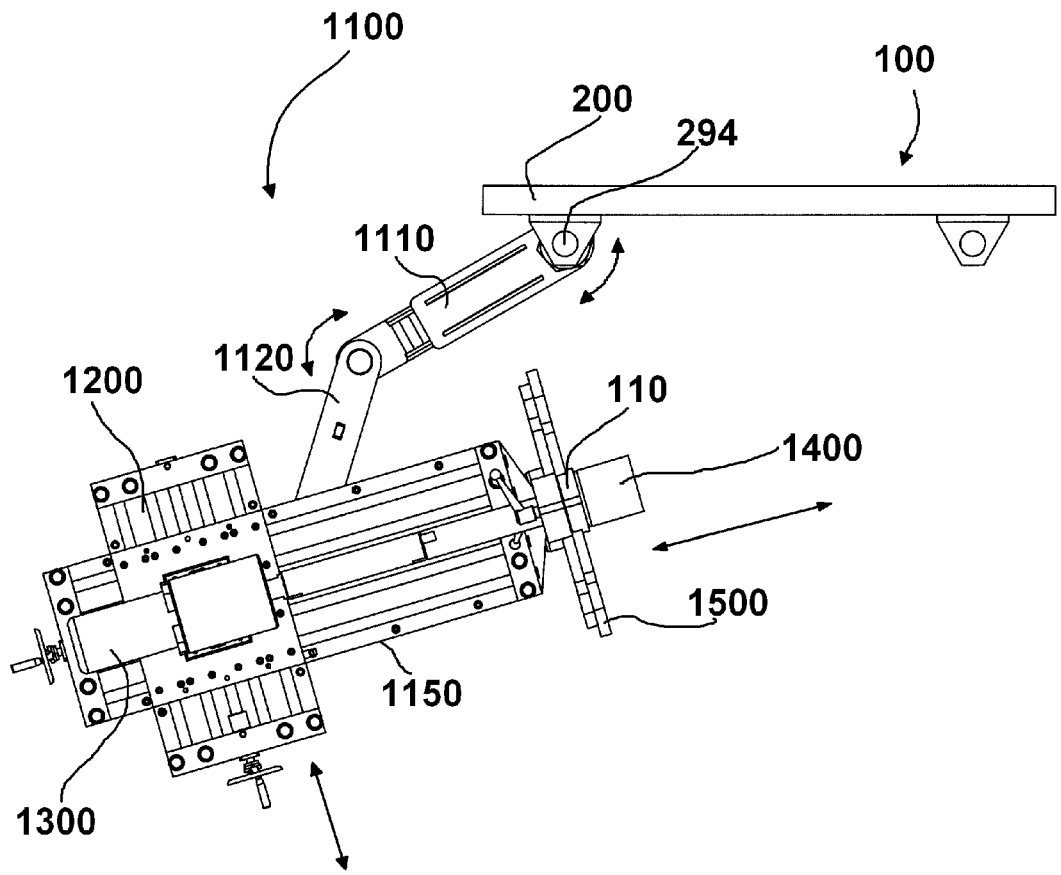
FIG. 35 is a top view of the preferred embodiment of an articulating drill system for making openings through the different pipes shown swiveled out of the way of the clamp where the system is connected to the plate, angled from same and in the center of main plate opening with the two sets of double arrows schematically indicating that drill tip can move back and forth through main plate opening along with rotating back and forth.
Figure 36:
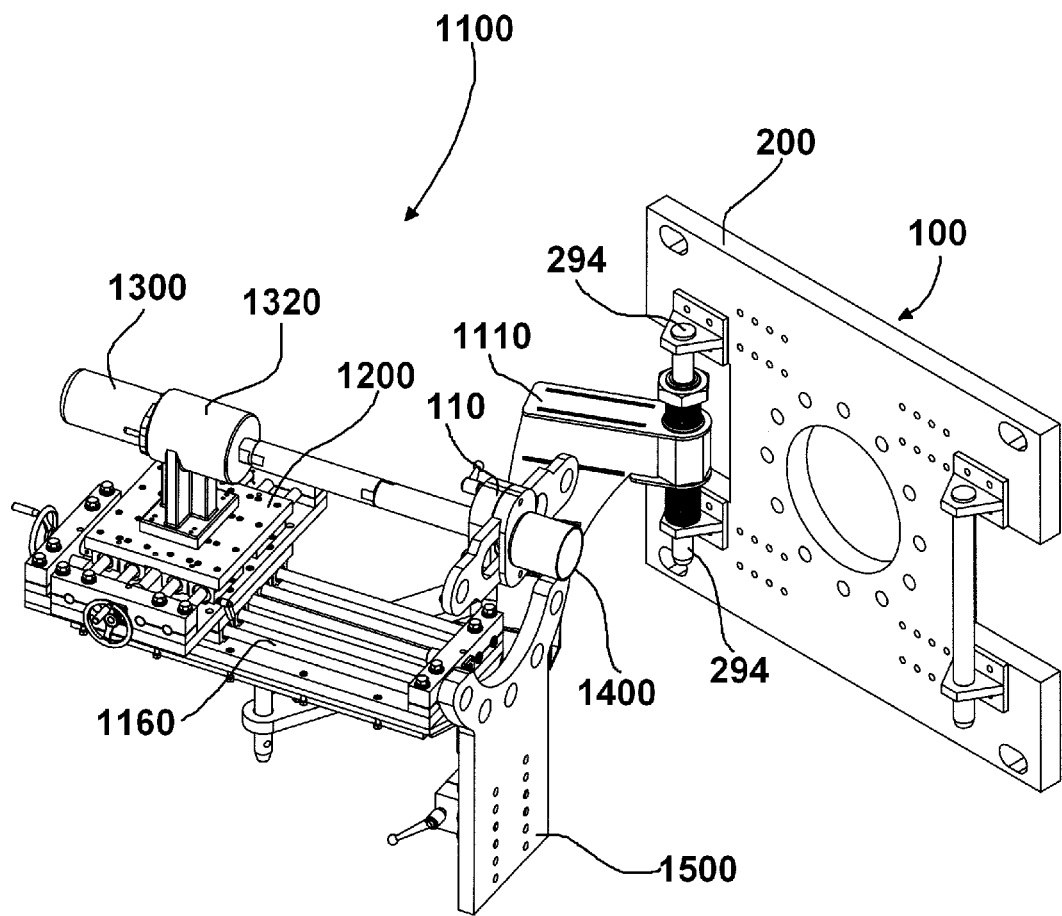
FIG. 36 is a perspective view of the articulating drill system of FIG. 35.

FIG. 35 is a top view of the preferred embodiment of an articulating drill system 1100 for making openings through the different pipes (e.g., pipes 50, 60, and 70) shown swiveled out of the way of the clamp where the system 1100 is connected to the plate 200, angled from same and in the center of main plate opening with the two sets of double arrows schematically indicating that drill tip can move back and forth through main plate opening along with rotating back and forth. FIG. 36 is a perspective view of the articulating drill system 1100.

Figure 37:
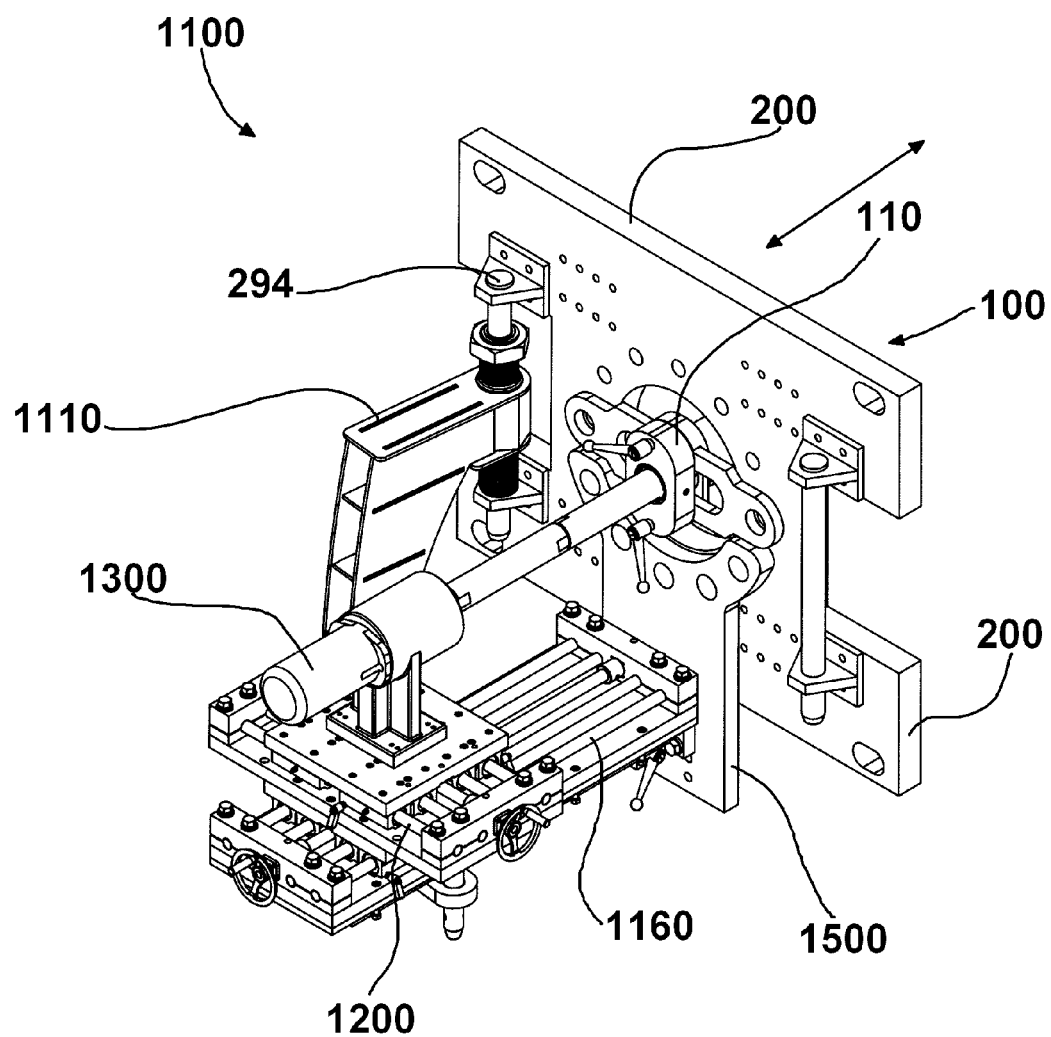
FIG. 37 is a perspective view of the articulating drill system of FIG. 35 shown in position to make a cut through one of the pipes, where the system is connected to the plate, perpendicular to same and in the center of main plate opening with the double arrow schematically indicating that drill tip can move back and forth through main plate opening.

FIG. 37 is a perspective view of articulating drill system 1100 shown in a centered position to make a cut through one of the pipes (e.g., pipes 50, 60, and 70), where the system is connected to the plate 200, perpendicular to same and in the center of main plate opening with the double arrow schematically indicating that drill tip 1400 can move back and forth through main plate opening.

Figure 38:
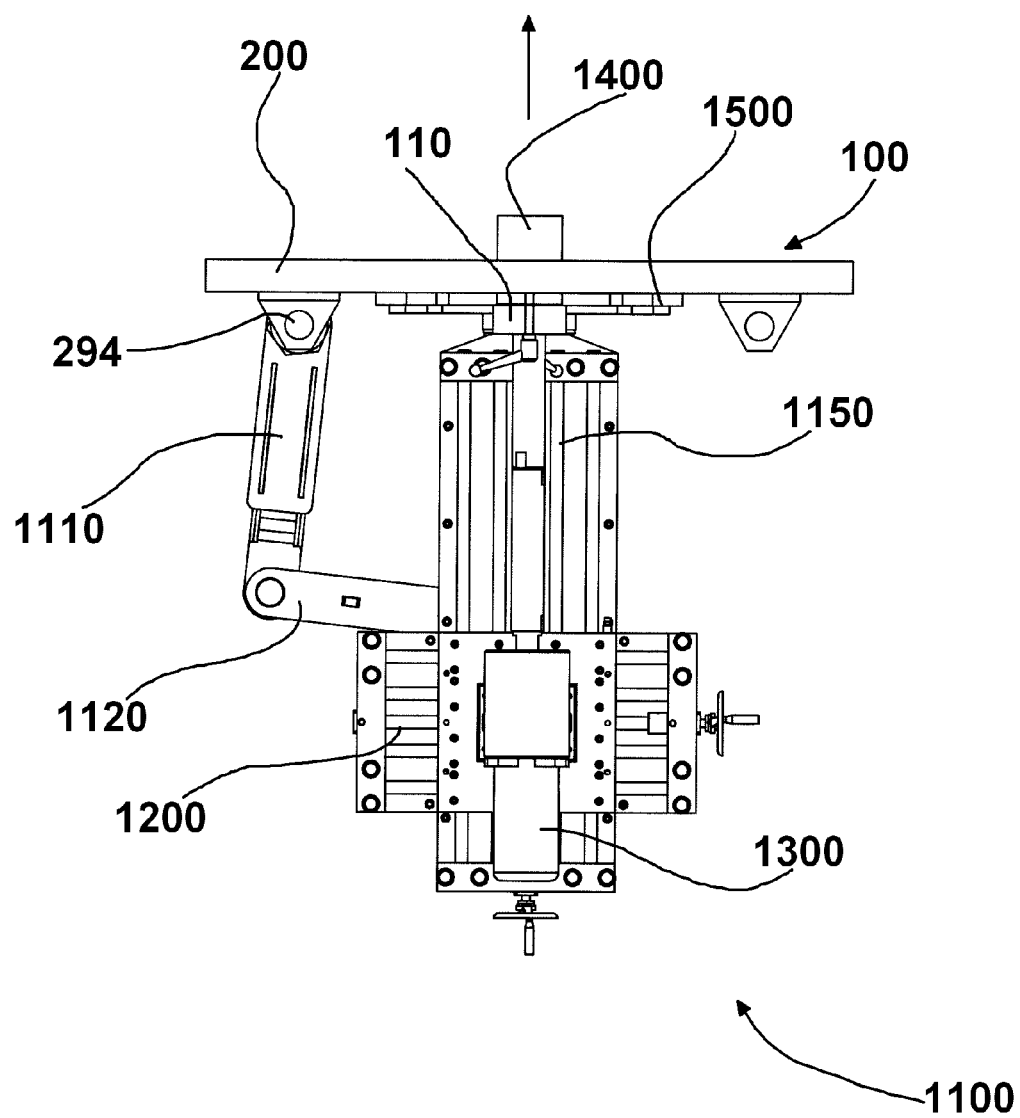
FIG. 38 is a top view of the articulating drill system of FIG. 37 where the drill tip has been moved in a position to make a cut and the stabilizer has been attached to stabilize the drill tip when making a cut.
Figure 39:
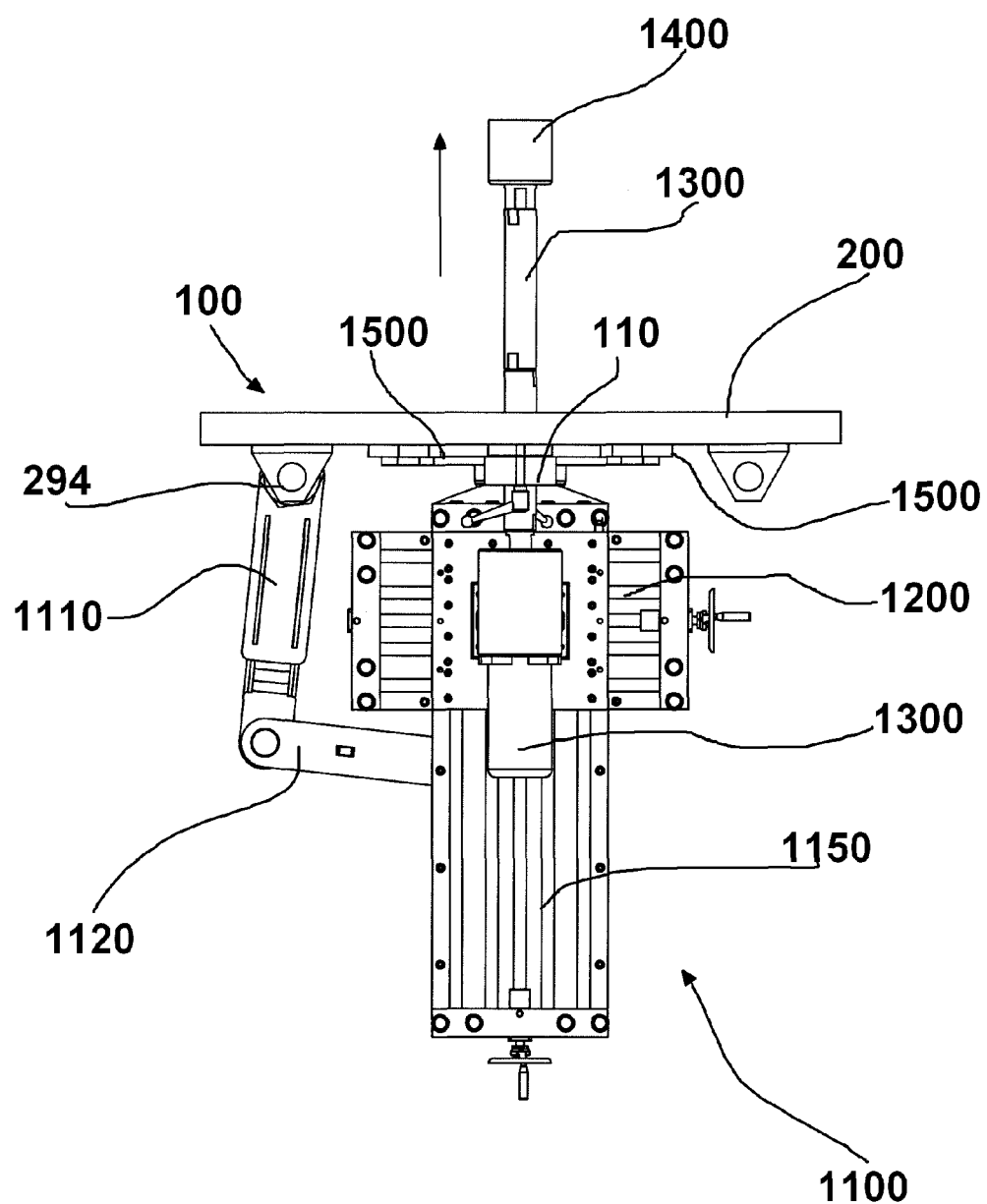
FIG. 39 is a top view of the articulating drill system shown in the position of FIG. 37 where the drill tip has been moved through the plate (and the articulating joint of the stabilizer) and towards an item to be cut.

FIG. 38 is a top view of the articulating drill system 1100 where the drill tip 1400 has been moved in a position to make a cut and the stabilizer 110 has been attached to stabilize the drill tip 1400 when making a cut. FIG. 39 is a top view of the articulating drill system 1100 (shown in the position of FIG. 38), where the drill tip 1400 has been moved through the plate 200 (and the articulating joint of the stabilizer 110) and towards an item to be cut (e.g., pipes 50, 60, and 70).

Figure 40:
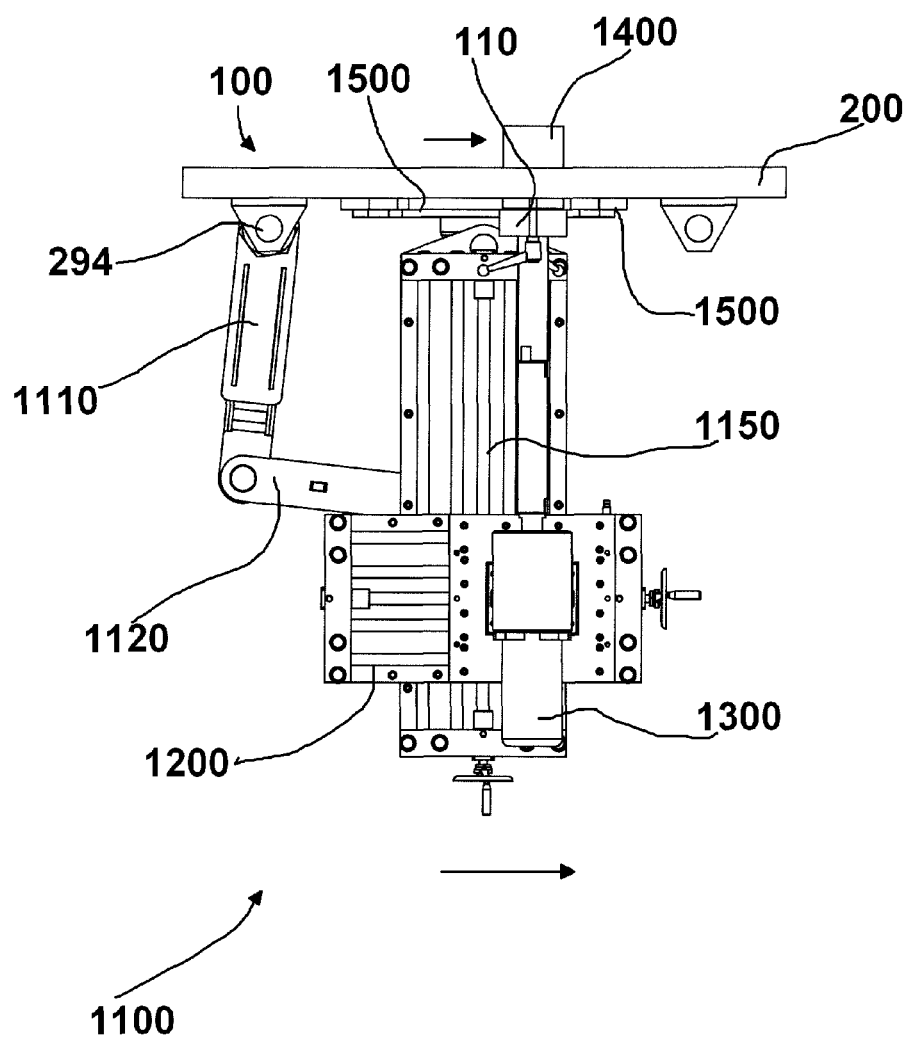
FIG. 40 is a top view of the articulating drill system of FIG. 37, where the system is connected to the plate, perpendicular to same and offset in the right direction of the arrow from the center of main plate opening, and where the drill tip (and the articulating joint of the drill shaft stabilizer) has been shifted to the right from a perpendicular and the drill tip has been moved in a position to make a cut at such angle.
Figure 41:
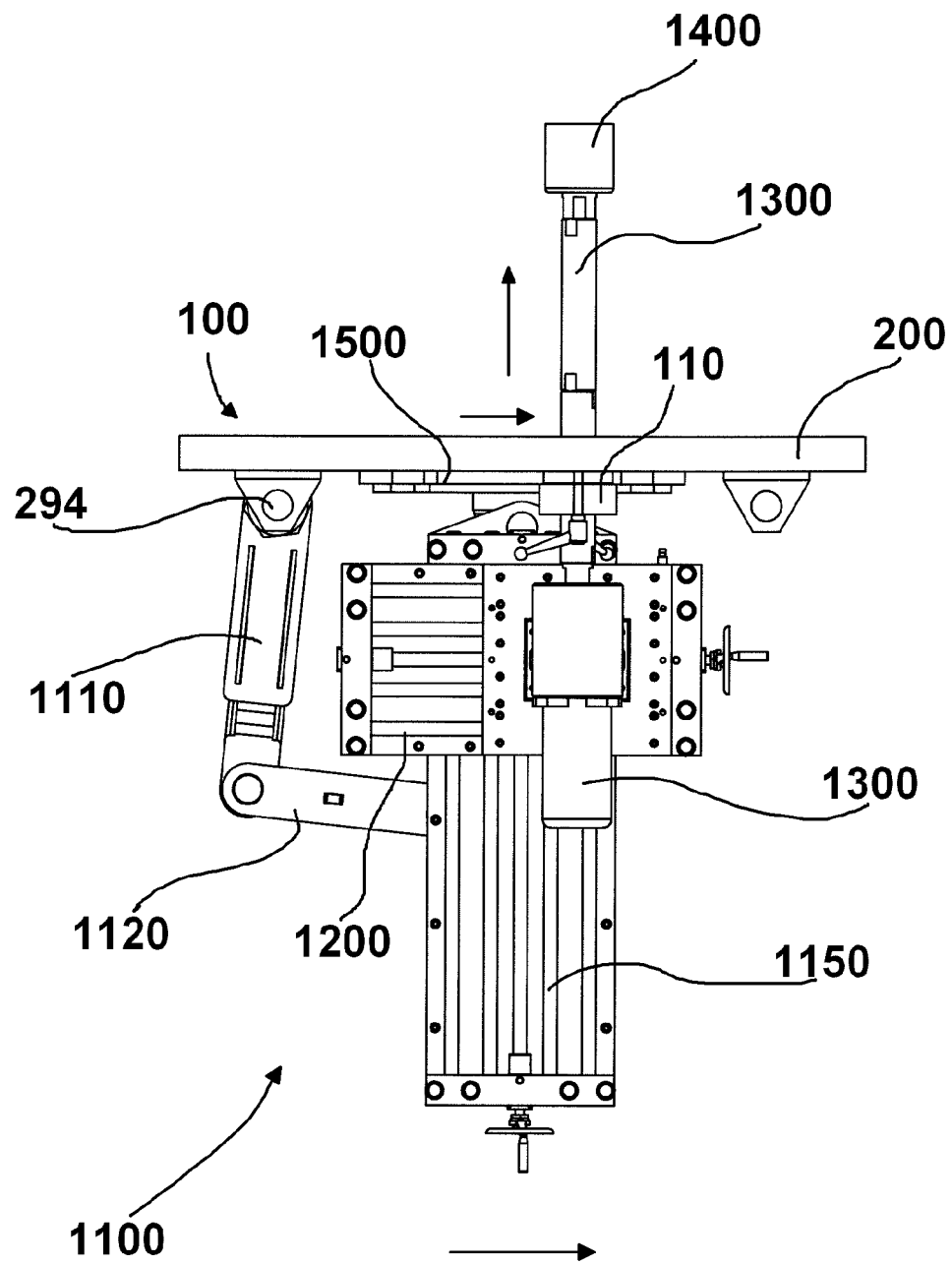
FIG. 41 is a top view of the articulating drill system shown in the position of FIG. 40, where the system is connected to the plate, perpendicular to same and offset in the right direction of the arrow from the center of main plate opening and the drill tip is passed through the main opening, where the drill tip has been moved through the plate (and the articulating joint of the stabilizer) and towards an item to be cut.

FIG. 40 is a top view of the articulating drill system 1100, where the system 1100 is connected to the plate 200, perpendicular to same and offset in the right direction of the arrow from the center of main plate opening, and where the drill tip 1400 (and the articulating joint of the drill shaft stabilizer 110) has been shifted to the right from a perpendicular and the drill tip 1400 has been moved in a position to make a cut at such shifted position. FIG. 41 is a top view of the articulating drill system 1100 (shown in the position of FIG. 40), where the system 1100 is connected to the plate 200, perpendicular to same and offset in the right direction of the arrow from the center of main plate opening and the drill tip 1400 is passed through the main opening, where the drill tip 1400 has been moved through the plate (and the articulating joint of the stabilizer 110) and towards an item to be cut (e.g., pipes 50, 60, and 70).

Figure 42:
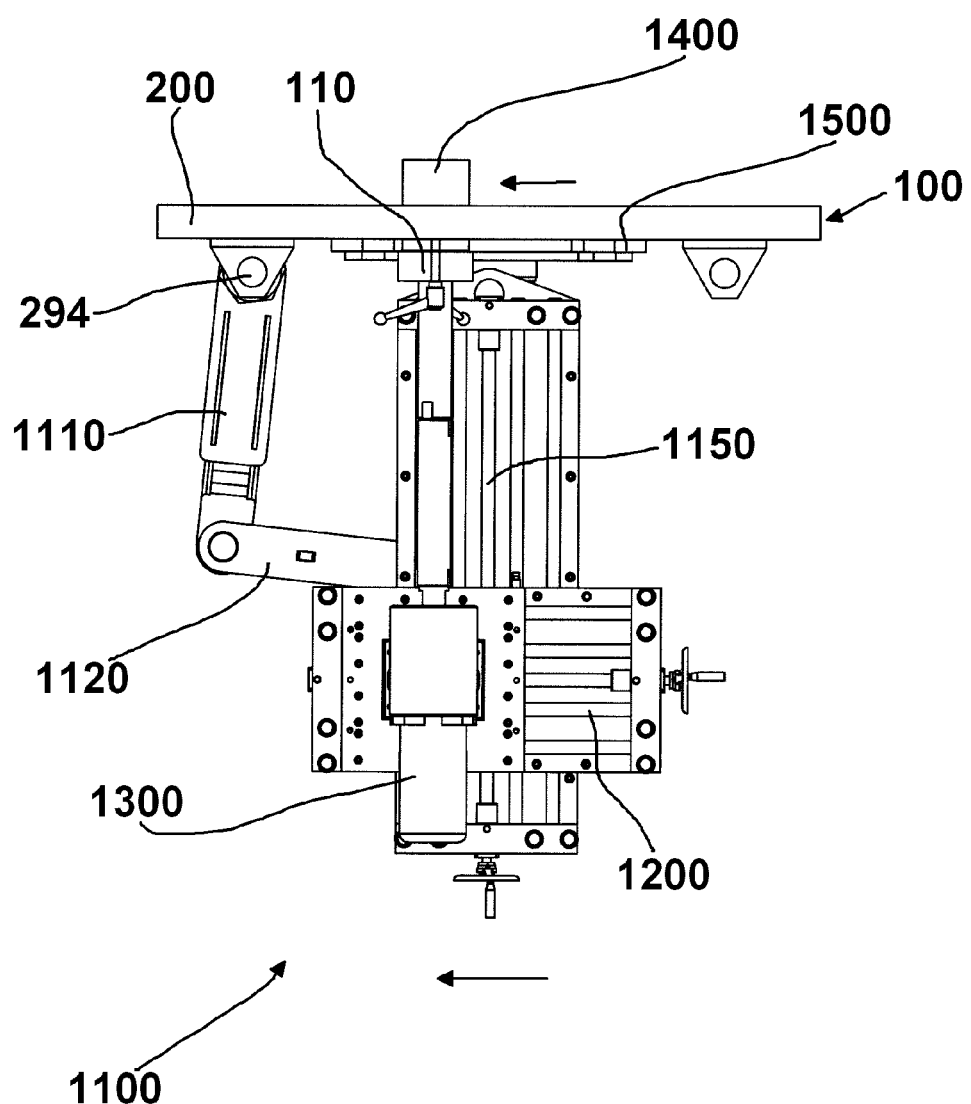
FIG. 42 is a top view of the articulating drill system of FIG. 40, where the system is connected to the plate, perpendicular to same and offset in the left direction of the arrow from the center of main plate opening, and where the drill tip (and the articulating joint of the drill shaft stabilizer) has been shifted to the left from a perpendicular and the drill tip has been moved in a position to make a cut at such angle.
Figure 43:
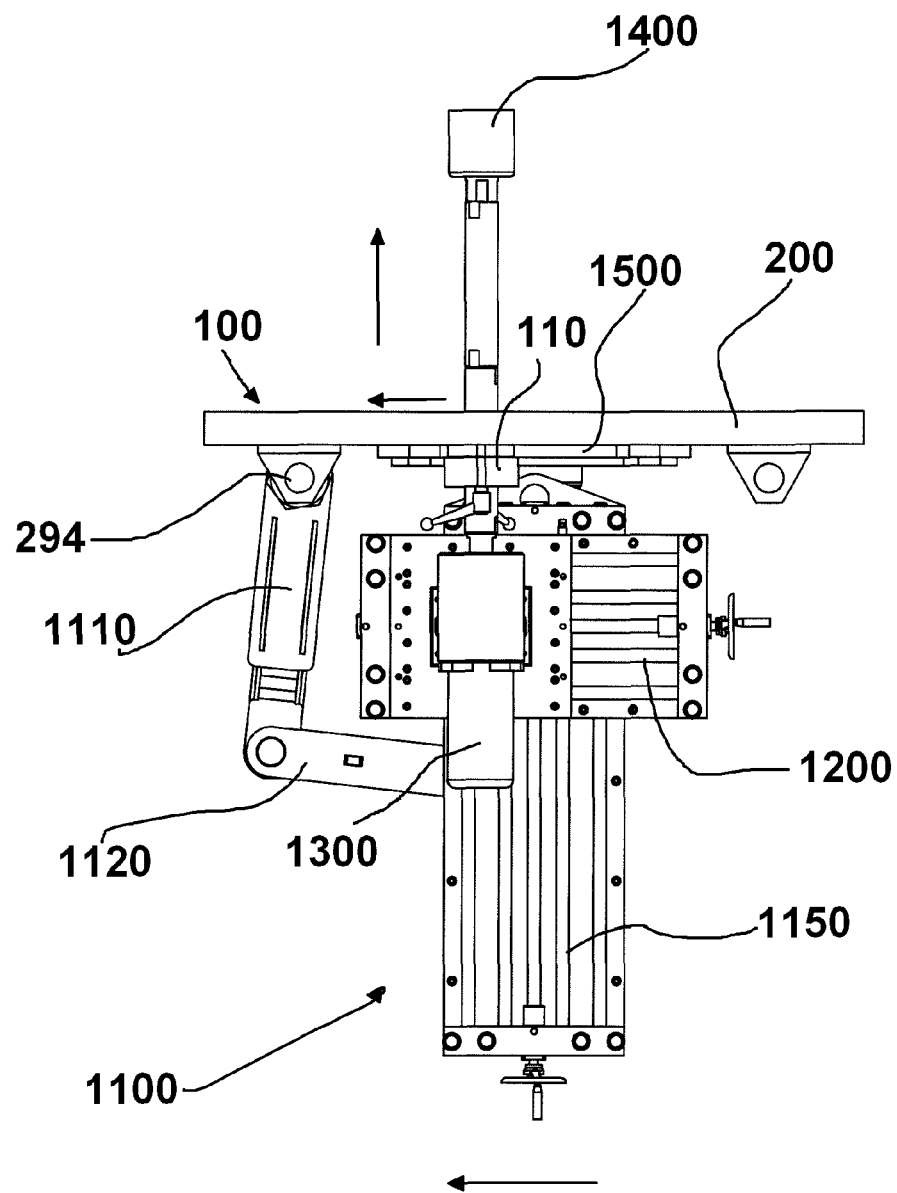
FIG. 43 is a top view of the articulating drill system shown in the position of FIG. 42, where the system is connected to the plate, perpendicular to same and offset in the left direction of the arrow from the center of main plate opening and the drill tip is passed through the main opening, and where the drill tip has been moved through the plate (and the articulating joint of the stabilizer) and towards an item to be cut.

FIG. 42 is a top view of the articulating drill system 1100, where the system 1100 is connected to the plate 200, perpendicular to same and offset in the left direction of the arrow from the center of main plate opening, and where the drill tip 1400 (and the articulating joint of the drill shaft stabilizer 110) has been shifted to the left from a perpendicular, and the drill tip 1400 has been moved in a position to make a cut at such angle. FIG. 43 is a top view of the articulating drill system 1100 (shown in the position of FIG. 42), where the system 1100 is connected to the plate 200, perpendicular to same and offset in the left direction of the arrow from the center of main plate opening, and the drill tip 1400 is passed through the main opening, and where the drill tip 1400 has been moved through the plate (and the articulating joint of the stabilizer 110) and towards an item to be cut (e.g., pipes 50, 60, and 70).

Figure 44:
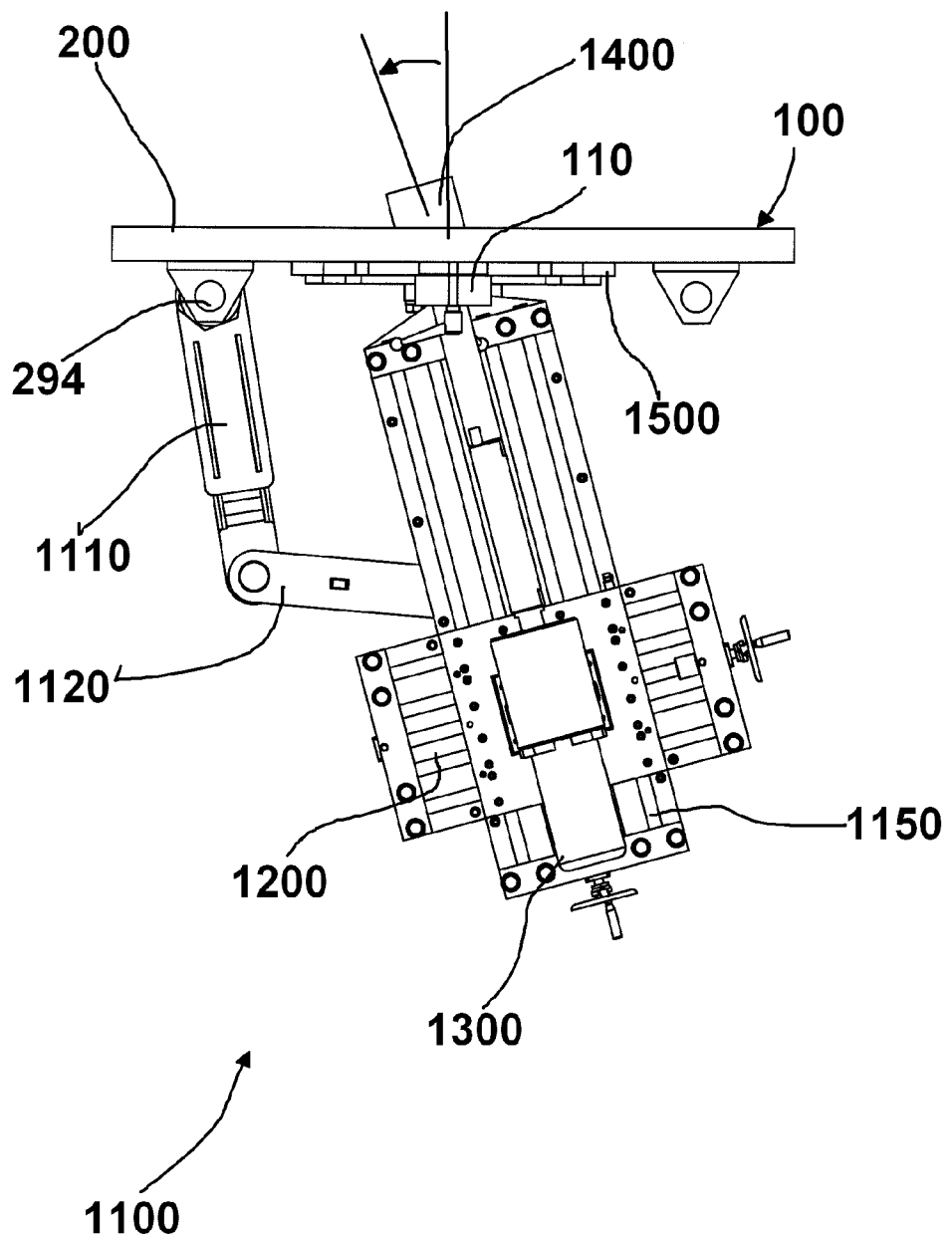
FIG. 44 is a top view of the articulating drill system of FIG. 35, where the system is connected to the plate, angled from a perpendicular to same as indicated by the arrows, where and the drill tip is passed through the main opening, and where the drill tip (along with the articulating joint of the stabilizer) has been angled from a perpendicular and the drill tip has been moved in a position to make a cut at such angle, and the stabilizer joint has also angled to allow the drill shaft to angle. Of course the system can be angled in the opposite angular direction.
Figure 45:
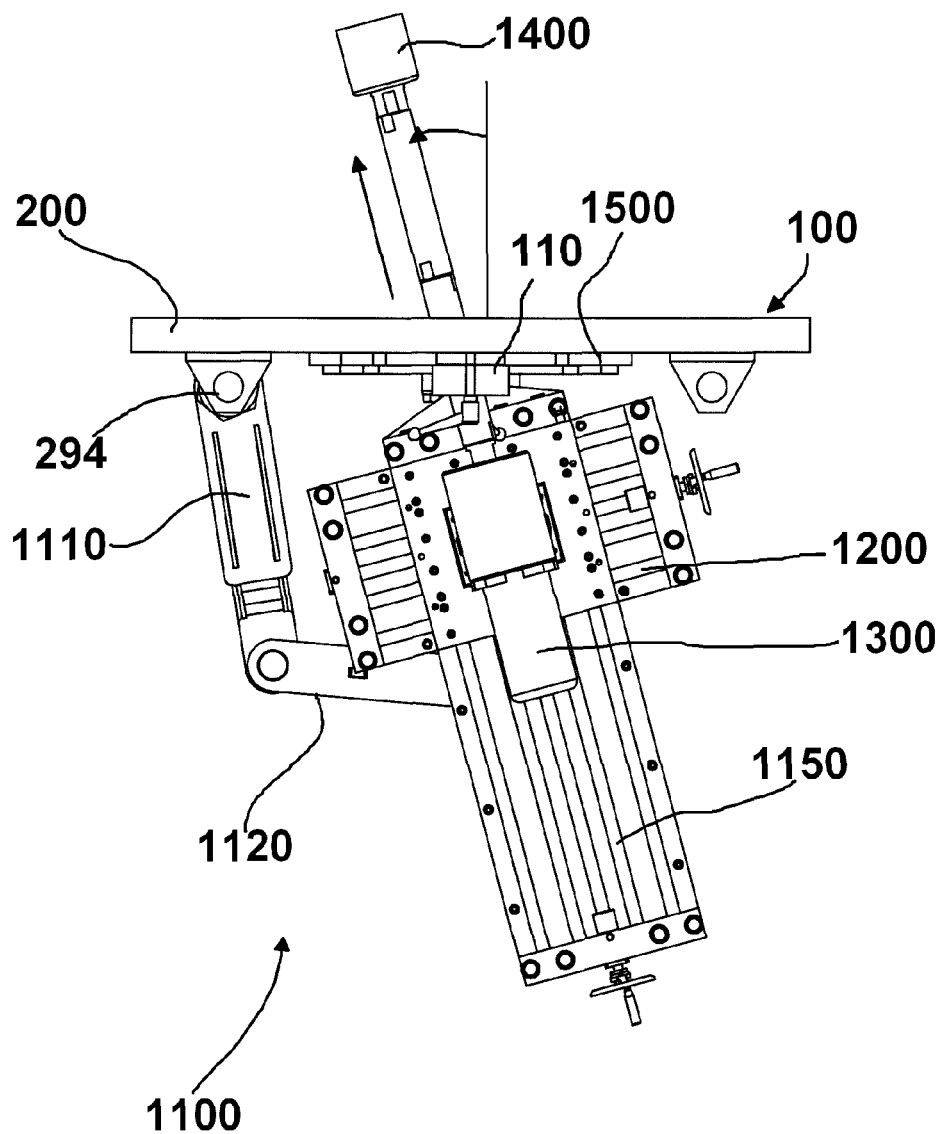
FIG. 45 is a top view of the articulating drill system, where the system is connected to the plate, angled from a perpendicular to same as indicated by the arrows, where and the drill tip is passed through the main opening, and where the drill tip has been moved through the plate (and the articulating joint of the stabilizer) and towards an item to be cut.

FIG. 44 is a top view of the articulating drill system 1100, where the system 1100 is connected to the plate 200, angled from a perpendicular to same as indicated by the arrow, where and the drill tip 1400 is passed through the main opening, and where the drill tip 1400 (along with the articulating joint of the stabilizer 110) has been angled from a perpendicular, and the stabilizer joint 110 has also angled to allow the drill shaft to angle. Of course the system can be angled in the opposite angular direction. FIG. 45 is a top view of the articulating drill system 1100 (shown in the position of FIG. 44), where and the drill tip 1400 has passed through the main opening, and where the drill tip 1400 has been moved through the plate 200 (and the articulating joint of the stabilizer 110) and towards an item to be cut (e.g., pipes 50, 60, and 70).

Figure 46:
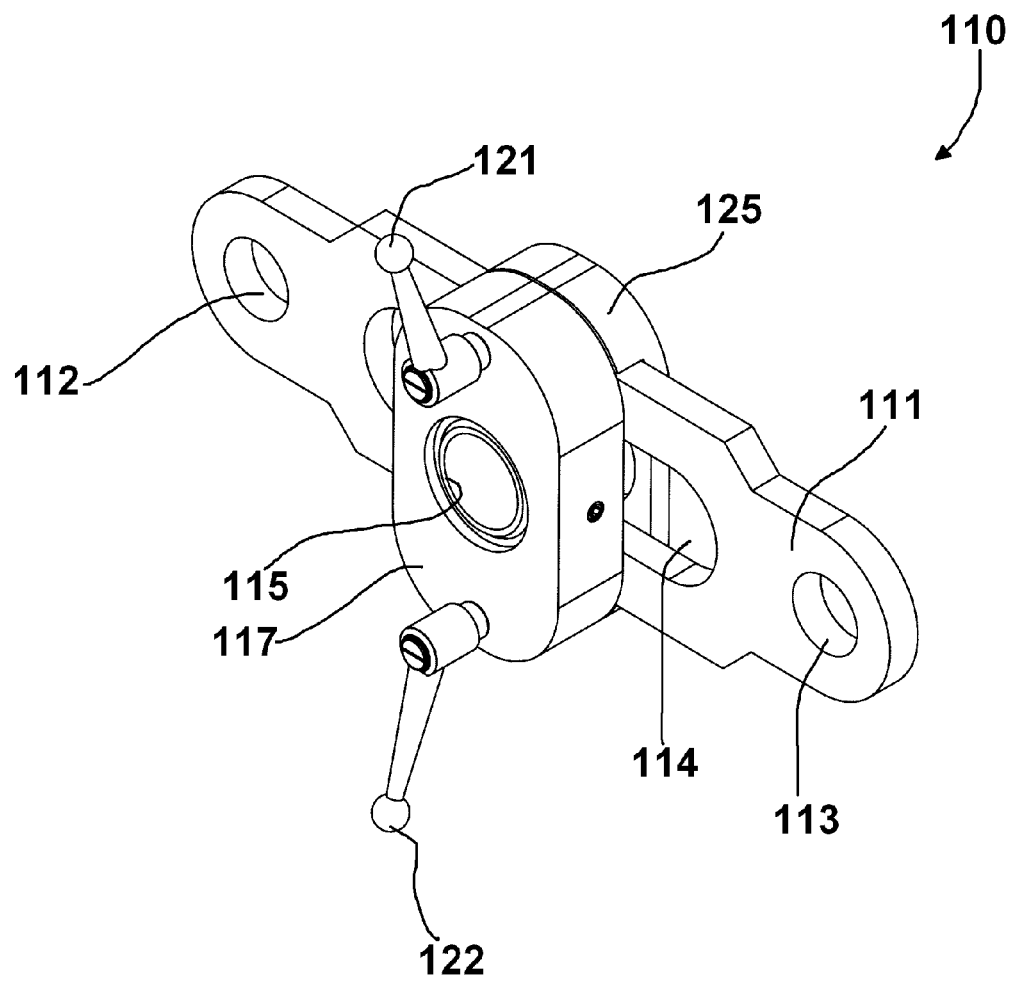
FIG. 46 is a perspective view of a stabilizer system for the drill shaft and bit.
Figure 47:
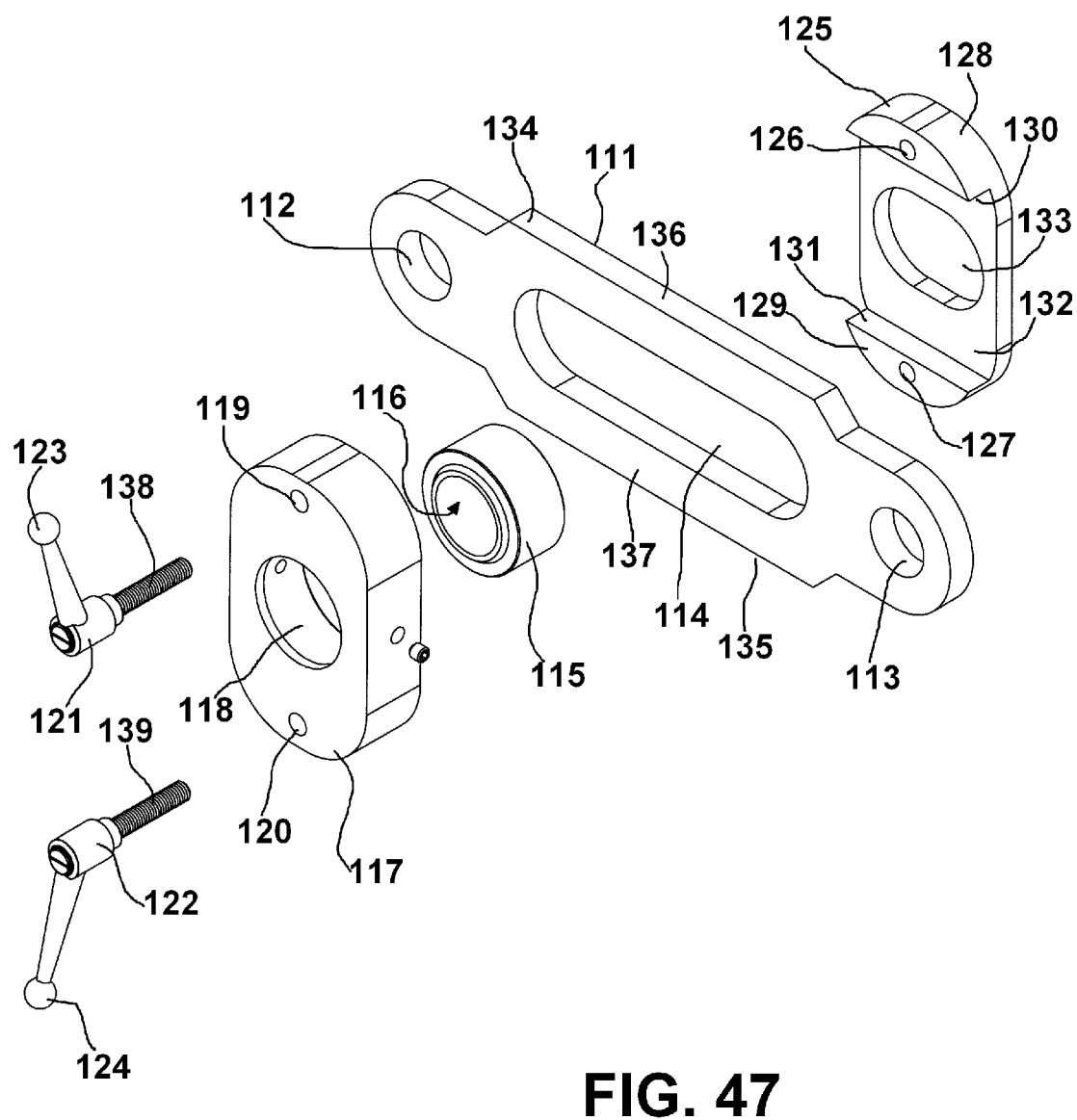
FIG. 47 is an exploded view of the stabilizer system of FIG. 46.

FIG. 46 is a perspective view of a stabilizer system 110 for the drill shaft and bit 1400. FIGS. 48, 49, and 50 are front, side and top views of the stabilizer system 110 of FIG. 46. FIG. 47 is an exploded view of the stabilizer system 110 of FIG. 46.

Stabilizer system 110 includes a plate 111 having central slot 114 and plate openings 112, 113. The plate 111 is clamped or sandwiched in between housing sections 117, 125 with bearing 115 in between. Bearing 115 is an annular bearing that is sized and shaped to fit cavity 118 of housing section 117 while enabling bearing 115 to pivot with hot tapping tool that passes through opening 116. Clamps or bolts 121, 122 can be loosened to allow bearing 115 (and a hot tapping tool) to pivot while being supported by the bearing 115 and the housing sections and plate 111, 117, 125. Each clamp or bolt can have a lever or handle 123 or 124 for enabling a user (e.g. diver 9) to tighten the bolts or clamps 121, 122 once a selected angular position of the hot tapping tool is selected. Housing section 125 has surface 130 which slides upon surface 134 of plate 111. Housing section 125 has surface 131 which slides upon surface 135 of plate 111. Housing section 132 slides upon rear surface 136 of plate 111. In this fashion, a user such as diver 9 can loosen bolts or clamps 121, 122 and slide the housing sections 117, 125 laterally relative to plate 111. The plate 111 can be bolted to a selected part of clamp 100 using bolted connections at plate openings 112, 113. The housing section 125 has internally threaded openings 126, 127 that accept threaded portions 138 or 139 of bolts 121 or 122.

The following is a list of Reference numerals which are used in this application.

| LIST OF REFERENCE NUMERALS | |
|---|---|
| Reference Number | Description |
| 1 | damaged platform |
| 2 | seabed |
| 3 | water surface |
| 4 | jacket |
| 5 | upper |
| 6 | deck area |
| 7 | derrick |
| 8 | bend |
| 9 | driver |

-continued

LIST OF REFERENCE NUMERALS

| Reference Number | Description |
|---|---|
| 10 | system |
| 50 | first pipe |
| 51 | opening |
| 60 | second pipe |
| 61 | opening |
| 62 | annular space between first and second pipes |
| 70 | third pipe |
| 71 | opening |
| 72 | annular space between second and third pipes |
| 80 | fourth pipe or tubing |
| 82 | annular space between third and fourth pipes |
| 84 | interior of fourth pipe or tubing |
| 100 | clamp |
| 110 | stabilizer system |
| 111 | plate |
| 112 | plate opening |
| 113 | plate opening |
| 114 | plate slot |
| 115 | annular bearing |
| 116 | central opening |
| 117 | first bearing housing section |
| 118 | cavity |
| 119 | opening |
| 120 | opening |
| 121 | bolt |
| 122 | bolt |
| 123 | lever/handle |
| 124 | lever/handle |
| 125 | second bearing housing section |
| 126 | internally threaded opening |
| 127 | internally threaded opening |
| 128 | upper part |
| 129 | lower part |
| 130 | upper flat surface |
| 131 | lower flat surface |
| 132 | middle flat surface |
| 133 | opening |
| 134 | upper flat plate surface |
| 135 | lower flat plate surface |
| 136 | rear flat plate surface |
| 137 | front flat plate surface |
| 138 | threaded portion |
| 139 | threaded portion |
| 150 | chain |
| 200 | first plate |
| 210 | first side |
| 220 | second side |
| 230 | main opening |
| 240 | plurality of openings |
| 294 | pin |
| 299 | pin |
| 500 | compression plate |
| 510 | first side |
| 520 | second side |
| 530 | plurality of support openings |
| 550 | main opening |
| 551 | offset from centerline |
| 552 | arrow |
| 554 | arrow |
| 560 | tapered area |
| 580 | view opening |
| 582 | view opening |
| 584 | view opening |
| 586 | view opening |
| 800 | swivel nut |
| 1100 | articulating drill system/articulating saw |
| 1110 | first arm |
| 1120 | second arm |
| 1122 | pivot connection between first and second arms |
| 1150 | base |
| 1152 | pivot connection between second arm and base |
| 1160 | longitudinal track system |
| 1170 | handle for longitudinal track system |
| 1200 | perpendicular track system |
| 1210 | handle for perpendicular track system |

-continued

LIST OF REFERENCE NUMERALS

| Reference Number | Description |
|---|---|
| 1300 | drill |
| 1320 | drill motor |
| 1400 | cutting tip |
| 1410 | arrow |
| 1420 | arrow |
| 1500 | connection plate |
| 1502 | plurality of openings |
| 1510 | pivoting joint between connection plate and base |
| 1550 | quick release/quick lock for pivoting joint |
| 2000 | hot tapping system |
| 2010 | tip |
| 2050 | barrel |
| 2100 | hot tap drill |
| 2110 | drill bit |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An articulating drill system for cutting one or more tubular members, compromising:
   (a) a drill base;
   (b) an articulating boom including a first arm, a second arm, a pivotal connection joining the first and second arms, and a plate having a plate opening, wherein the first arm is pivotally attached to the drill base, and the plate is pivotally attached to the second arm;
   (c) a drill having a drill motor and a cutting tip rotatively connected to the drill and a cutting axis upon which the cutting tip rotates;
   (d) a clamping mechanism attached to the plate that enables the plate to be attached to a tubular that is to be cut, the clamping mechanism generally aligning the plate opening with the tubular;
   (e) wherein the clamping mechanism and plate support the articulating boom, drill and drill base; and
   (f) the articulating boom enabling selective placement of the cutting tip relative to the plate opening, including angulation of the cutting axis relative to the plate opening.

2. The articulating drill system of claim 1, wherein the plate is pivotally attached to the second arm at a plurality of selectable locations on the plate.

3. The articulating drill system of claim 1 further including a drill bit stabilizer rotatively connected to the drill bit and stabilizing the cutting axis upon which the cutting tip rotates, the stabilizer being detachably connected to the plate, the stabilizer including a bearing which can pivot along with the cutting axis upon which the cutting tip rotates also pivots.

4. The articulating drill system of claim 1, further including a cutting tip stabilizer rotatively connected to the cutting tip and stabilizing the cutting axis upon which the cutting tip rotates, the cutting tip stabilizer including first and second stabilizer portions which are slidably connected to each other, the first stabilizer portion being detachably connected to the plate, and the second stabilizer portion being rotatively connected to the cutting tip, and further including a stabilizer sliding lock having a first unlocked condition and a second locked condition, wherein in the first unlocked condition the first and the second stabilizer portions of the cutting tip stabilizer can slide relative to each other and in the second locked condition the first and second stabilizer portions of the cutting tip stabilizer are locked from sliding relative to each other.

5. The articulating drill system of claim 1, further compromising an adjustment mechanism interfacing the drill and the drill base, said adjustment mechanism enabling selective movement of the drill toward or away from the articulating boom.

6. The articulating drill system of claim 5, wherein the drill is movable upon the drill base along a longitudinal axis.

7. The articulating drill system of claim 5, wherein the drill is movable upon the drill base along a transverse axis.

8. The articulating drill system of claim 5, wherein the drill base includes a base plate and a motor mount and wherein the drill motor is attached to the motor mount and wherein said adjustment mechanism is in between the motor mount and the base plate.

9. The articulating drill system of claim 1, wherein the plate is pivotally attached to the second arm at a plurality of selectable locations on the plate.

10. The articulating drill system of claim 1, further including a drill bit stabilizer rotatively connected to the drill bit and stabilizing the cutting axis upon which the cutting tip rotates, the stabilizer being detachably connected to the plate, the stabilizer including a bearing which can pivot along with the cutting axis upon which the cutting tip rotates also pivots.

11. The articulating drill system of claim 1, further including a cutting tip stabilizer rotatively connected to the cutting tip and stabilizing the cutting axis upon which the cutting tip rotates, the cutting tip stabilizer including first and second stabilizer portions which are slidably connected to each other, the first stabilizer portion being detachably connected to the plate, and the second stabilizer portion being rotatively connected to the cutting tip, and further including a stabilizer sliding lock having a first unlocked condition and a second locked condition, wherein in the first unlocked condition the first and second stabilizer portions of the cutting tip stabilizer can slide relative to each other and in the second locked condition the first and second stabilizer portions of the cutting tip stabilizer are locked from sliding relative to each other.

12. An articulating drill system for cutting one or more tubular members, comprising:
(a) a drill base;
(b) an articulating boom having first and second end portions, the first end portion being attached to the drill base, the second end portion of the articulating boom being attached to a plate having a plate opening;
(c) a drill having a cutting tip and a drill rotary axis upon which the cutting tip rotates, the cutting tip supported upon the drill base;
(d) a clamping mechanism attached to the plate that enables the plate to be attached to a tubular that is to be cut selected from the one or more tubular members, the clamping mechanism being configured to position the plate opening next to the tubular so that the cutting tip can pass through the plate opening and then engage the tubular that is to be cut;
(e) wherein the clamping mechanism and plate support the articulating boom, drill and drill base; and
(f) the articulating boom enabling placement of the drill cutting tip relative to the plate opening.

13. The system of claim 12, wherein the boom is pivotally attached to the plate.

14. The system of claim 12, wherein the articulating boom has multiple arms which are connected one arm to another arm.

15. The system of claim 14, wherein pivotal connections join each arm to another arm.

16. The system of claim 15, wherein the first end of the articulating boom can also be pivotally connected to the plate, and this pivotal connection between the second end of the articulating boom and the plate includes a quick lock/quick release system which can lock or unlock the pivoting connection.

17. The system of claim 14, wherein there are three arms including a third arm and wherein the third arm includes a first slider which slidingly connects the drill to the third arm and allows for selected linear movement of the drill relative to the third arm in a first direction.

18. The system of claim 17, wherein the third arm includes a second slider which slidingly connects the drill to the third arm and allows for selected linear movement of the drill relative to the third arm in a second direction, wherein the second direction is not parallel to the first direction.

19. The system of claim 18, wherein the second direction is perpendicular to the first direction.

20. The articulating drill system of claim 12, further comprising an adjustment mechanism interfacing the drill motor and the base, said adjustment mechanism enabling movement of the drill motor toward or away from the articulating boom.

21. The articulating drill system of claim 12, wherein the drill base includes a first lower base plate and a second higher base plate, the first base plate and second base plate being movable, one relative to the other.

* * * * *